United States Patent [19]
Saeijs et al.

[11] Patent Number: 5,596,581
[45] Date of Patent: Jan. 21, 1997

[54] RECORDING AND REPRODUCING AN MPEG INFORMATION SIGNAL USING TAGGED TIMING INFORMATION

[75] Inventors: Ronald W. J. J. Saeijs, Eindhoven, Netherlands; Imran A. Shah, Ossining, N.Y.; Takashi Sato, Tokyo, Japan

[73] Assignee: Philips Electronics North America Corporation, New York, N.Y.

[21] Appl. No.: 253,535

[22] Filed: Jun. 3, 1994

Related U.S. Application Data

[63] Continuation-in-part of Ser. No. 225,193, Apr. 8, 1994.

[51] Int. Cl.$^6$ .............................. H04J 3/00; H04N 5/76
[52] U.S. Cl. ......................... 370/394; 370/522; 386/104
[58] Field of Search ................... 370/94.1, 94.2, 370/110.1, 100.1, 112; 348/423, 460, 461, 465, 473; 360/36.1, 36.2, 48; 358/335, 342, 343

[56] References Cited

U.S. PATENT DOCUMENTS

| | | | |
|---|---|---|---|
| 4,794,465 | 12/1988 | Van Luyt et al. | 358/341 |
| 5,122,875 | 6/1992 | Raychaudhuri et al. | 370/110.1 |
| 5,142,421 | 8/1992 | Kahlman et al. | 360/40 |
| 5,245,483 | 9/1993 | Van Gestel | 360/40 |
| 5,287,178 | 2/1994 | Acampora et al. | 370/110.1 |
| 5,396,497 | 3/1995 | Veltman | 370/100.1 |
| 5,400,187 | 3/1995 | Van Gestel | 360/48 |
| 5,424,878 | 6/1995 | Rijckaert | 360/19.1 |

FOREIGN PATENT DOCUMENTS

| | | |
|---|---|---|
| 93202950 | 1/1993 | European Pat. Off. . |
| 932012636 | 5/1993 | European Pat. Off. . |

*Primary Examiner*—Hassan Kizou

[57] ABSTRACT

A method of transmitting timing critical data via an asynchronous channel without changing any datum to be transmitted. The timing critical data can be an MPEG transport stream. The asynchronous channel can be a computer or telephone network, a digital storage media such as a digital VCR, or a digital interface. The method involves tagging each transmission unit of the data stream, before inputting to the channel, with timing information, and using the timing information at the output end of the channel to recreate the proper data timing, Various schemes are described for packing the timing information tags with each or a plurality of transmission units.

22 Claims, 12 Drawing Sheets

FIG. 8c: | $P_{k-4}$ | DUMMY | DUMMY | $P_{k-1}$ | $P_k$ | DUMMY | $P_{k+2}$ | DUMMY | $P_{k+4}$ |

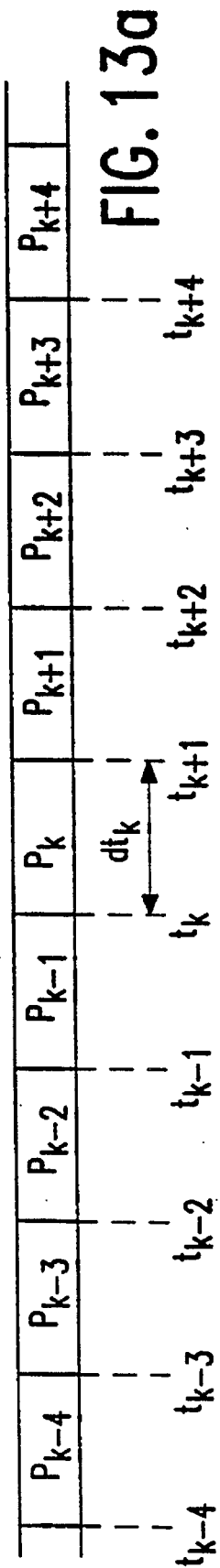

RECORDING AND REPRODUCING AN MPEG INFORMATION SIGNAL USING TAGGED TIMING INFORMATION

RELATED APPLICATION

This application is a continuation-in-part of commonly-assigned application, Ser. No. 08/225,193, filed Apr. 8, 1994, entitled "Recording And Reproducing An MPEG Information Signal On/From A Record Carrier" in the names of W. J. Van Gestel, R. W. J. J. Saeijs and I. A. Shah.

BACKGROUND OF THE INVENTION

The invention relates to a recording arrangement for recording an information signal in tracks on a record carrier, the recording arrangement comprising an input terminal for receiving the information signal, channel encoding means for channel encoding the information signal so as to obtain a channel signal suitable for recording in a track on said record carrier, writing means for writing the channel signal in the track, the channel signal comprising subsequent or a succession of signal blocks, each signal block comprising a first block section which comprises a synchronization signal and a second block section which comprises a number of channel bytes, to a record carrier obtained with the recording arrangement, and to a reproducing arrangement for reproducing the information signal from the record carrier.

A recording arrangement as given in the opening paragraph is known from EP-A 492,704, to which U.S. Pat. No. 5,245,483 corresponds The known arrangement is a recording arrangement of the helical scan type, such as used in a digital VCR (DVCR) and records an information signal comprising a digital audio signal and a digital video signal in audio signal recording sectors and video signal recording sectors respectively in subsequent tracks, where, when recording a track, the video signal recording sector in a track comes first and is followed by the audio signal recording sector. The order in which the sectors occur in a track can however also be in the reverse order. Further, other sectors may be included in a track, such as a clock run-in area located at the beginning of a track, so as to enable a locking-in of the internal system clock on the signals read from the track, and preamble and postamble areas that are located between the various sectors and function as an edit gap. Reference is made in this respect to the earlier filed European patent applications No. 93.202.950, to which U.S. Pat. No. 5,424,878 corresponds, and No. 93.201.263, to which U.S. Pat. No. 5,400,187 corresponds.

The prior art reference documents relate to proposals for the realization of a new digital video cassette (DVC) recorder standard, which enables the recording and reproduction of digital video and digital audio on/from a longitudinal magnetic record carrier such as magnetic tape. This new digital video recorder standard will lead to new digital video recorders/reproducers of the so-called DVC type.

BRIEF SUMMARY OF THE INVENTION

The invention aims at providing a recording arrangement which is capable of recording other types of information signals in the known tape format as defined in the preamble. The recording arrangement in accordance with the invention is characterized in that the information signal is an MPEG information signal in accordance with an MPEG format, the MPEG information signal comprising subsequent or a succession of transport packets, that the channel encoding means are adapted to store each time information included in x transport packets of the MPEG information signal in the second block section of a group of y signal blocks of the channel signal, that the second block section of at least the first signal block of the group of y signal blocks comprise a third block section for storing identification information identifying the signal clock as being the first signal block of the group of y signal blocks, and that x and y are integers such that $x \geq 1$ and $y \geq 1$. More specifically, the recording arrangement in accordance with the opening paragraph is characterized in that the information signal is an MPEG information signal in accordance with an MPEG format, the MPEG information signal comprising subsequent transport packets, that the channel encoding means are adapted to store each time information included in x transport packets of the MPEG information signal in the second block sections of a group of y signal blocks of the channel signal, that the second block sections of the signal blocks comprise a third block section for storing sequence number information relating to a sequence number of the signal blocks, and that x and y are integers such that $x \leq 1$ and $y \geq 1$.

The invention is based on the following recognition. The draft Grand Alliance HDTV System Specification dated Feb. 22, 1994, more specifically chapters V and VI of the specification, comprises a description of a transport system for transmitting an MPEG information signal, which includes a data compressed digital video signal and a corresponding data compressed digital audio signal, for broadcasting purposes or for transmission via a cable network. The MPEG information signal is in the form of transport packets having either an equal length or a variable length in time. In both cases, however, a transport packet comprises 199 bytes of information, the first byte of which being a synchronization byte.

A transmission such an MPEG information signal in the form of a recording on a reproduction from a record carrier, such as a magnetic record carrier as a tape, require special measures to be taken in order to realize such kind of transmission via the known tape format. More specifically, the invention relates to storing the transport packets in the signal blocks of the known tape format.

Generally, it can be said that, when storing the information included in a number of x transport packets of the MPEG information signal in a number of y signal blocks, some unoccupied space remains available in the y signal blocks for the storage of additional information, which additional information relates to the specific application of recording and reproducing the MPEG information signal on/from the record carrier. In a specific example of the DVC format, the second block sections of five signal blocks. Now, 11 bytes (=5×77−2×187) remain available in the five signal blocks. Those 11 bytes can be divided over the second block sections of the five signal blocks in various ways so as to obtain the third block sections. One such way is that the first two bytes of all second block sections are available as third block sections and that the last byte available can be considered as a third block section to indicate the boundary between the information of the two transport packets as stored in the five signal blocks.

In the above example, identification information identifying the signal block as being the first signal block of the group of y signal blocks can be stored in a third block section of the first signal block in a group of y signal blocks. Or, sequence number information (sequence numbers) relating to the sequence of the signal blocks can be stored in the third block sections. This sequence number can also be identified as a continuity counter. The measures proposed result in a number of advantages.

The advantage of using identification information identifying a signal block as being the first signal block in a group of y signal blocks, is that the beginning of a group can be detected, which simplifies the read-out of the data during reproduction.

One advantage using sequence numbers is that, when reproducing the signal blocks, it can be decided upon retrieval of the sequence numbers, whether a signal block has been missed because of reproduction errors or not, so that an error correction or concealment can be carried out. Another advantage is that one may shuffle the information to be stored in the signal blocks upon recording. Upon retrieval of the sequence numbers it is possible to realize a corresponding deshuffling in response to the sequence numbers retrieved so as to obtain the original data stream.

Further, having sequence numbers included in the third block sections of the signal blocks makes it possible to repeat signal blocks in the case that a transport packet of the MPEG data stream stored in those signal blocks requires a higher protection against errors that can occur during the recording and a subsequent reproduction process.

The recording arrangement as given in the opening paragraph may also be characterized in that the information signal is an MPEG information signal in accordance with an MPEG format, the MPEG information signal comprising subsequent transport packets, that the channel encoding means are adapted to store each time information included in x transport packets of the MPEG information signal in the second block sections of a first group of y first signal blocks of said signal blocks of the channel signal so as to enable a normal play mode using video information stored in said first group of y first signal blocks during a normal play reproduction mode, the channel encoding means further being adapted to retrieve a trick mode video signal from the MPEG information signal and being adapted to store said trick or feature mode video signal in second block sections of a second group of z second signal blocks of said signal blocks of the channel signal so as to enable a trick play mode using the video information stored in said second signal blocks, that the second block sections of at least one signal block in each first and second group of first and second signal blocks respectively comprise a third block section for storing identification information indicating whether the group comprises first signal blocks or second signal blocks, and that x, y and z are integers such that $x \geq 1$, $y \geq 1$ and $z \geq 1$. More specifically, the information signal is an MPEG information signal in accordance with an MPEG format, the MPEG information signal comprising subsequent transport packets, that the channel encoding means are adapted to store each time information included in x transport packets of the MPEG information signal in the second block sections of a group of y signal blocks of the channel signal, that the second block sections of at least those signal blocks in a group of y signal blocks that comprises the start portion of a transport packet comprise a third block section for storing sequence number information relating to a transport packet sequence number corresponding to the transport packet having its start portion stored in the second block section of the signal block, and that x and y are integers such that $x \geq 1$ and $y \geq 1$. This enables a reproduction in the reproducing arrangement in a normal play mode using the first signal blocks and a reproduction in a trick play mode using the second signal blocks, in response to the detection of the information indicating the groups comprising first signal blocks or second signal blocks respectively.

The recording arrangement as given in the opening paragraph may also be characterized in that the second block sections of all signal blocks in each first and second group of first and second signal blocks respectively comprise a third block section for storing identification information indicating whether the group comprises first signal blocks or second signal blocks. More specifically, the second block sections of a group of y signal blocks each comprise a third block section for storing sequence number information relating to a transport packet sequence number corresponding to the transport packet of which information is stored in said signal block.

Storing a packet sequence number has its advantages if an MPEG data stream is received having a constant bit or transport rate, and comprising a number of different video programs interleaved in the MPEG data stream. Generally, such data stream has a too high bit rate for recording the total data stream on the record carrier. Typically, the MPEG bit rate is 45 Mbps, whereas the record carrier typically records with a 25 Mbps bit rate. The recording arrangement now comprises a program selector for retrieving one video program and corresponding audio signal from the MPEG data stream so as to obtain the MPEG information signal for recording. As information corresponding to only one video program is included in a MPEG transport packet, such program selector selects only those transport packets from the MPEG data stream that comprise information corresponding to said only one video program. That means that some packets of the original MPEG data stream received are deleted. Upon reproduction however, an MPEG video signal in accordance with the MPEG standard, however now comprising only the one video program, should be regenerated or recreated. Such regenerated data stream should have the transport packets that were selected upon recording at the same location, that is in one or other way, dummy packets corresponding to the packets deleted upon recording must be inserted in the regenerated data stream. Upon recording a sequence number is added to each transport packet received, that is: also for the packets that will be deleted. The sequence numbers of the packets that are selected and stored is stored in the third block section of the signal blocks in which a transport packet is stored. Upon reproduction, a sequence of numbers is retrieved, where subsequent numbers will not necessarily be next higher numbers. In that situation one or more dummy packets must be inserted so as to regenerate the replica of the original MPEG data stream.

The recording arrangement as given in the opening paragraph can further be characterized in that the information signal is an MPEG information signal in accordance with an MPEG format, the MPEG information signal comprising subsequent transport packets, the recording arrangement comprising detection means for detecting the moment of receipt of the transport packets and for generating timing information for each transport packet received, the timing information for a transport packet corresponding to said moment of receipt of said transport packet, that the channel encoding means are adapted to each time store information included in x transport packets of the MPEG information signal in the second block sections of a group of y signal blocks of the channel signal, that the second block sections of at least those signal blocks in a group of y signal blocks that comprises the start portion of a transport packet comprise a third block section for storing the timing information for said transport packet having its start portion stored in the second block section of the signal block, and that x and y are integers such that x≧1 and y≧1. More specifically, the second block sections of a group of y signal blocks each comprise a third block section for storing the timing information corresponding to the transport packet which has information stored in the second block section of said signal block.

Storing timing information corresponding to transport packet requires that the recording arrangement is provided with detection means for detecting the time of receipt of a transport packet. This measure has its advantages if an MPEG data stream is received having a variable bit rate, and comprising a number of different video programs interleaved in the MPEG data stream. As has been said above, generally, such data stream has a too high bit rate for recording the total data stream on the record carrier. The recording arrangement now comprises a program selector for retrieving one video program with its corresponding audio signal from the MPEG data stream so as to obtain the MPEG information signal for recording. As information corresponding to only one video program is included in a MPEG transport packet, such program selector selects only those transport packets from the MPEG data stream that comprise information corresponding to said only one video program. By detecting and storing the timing information corresponding to a transport packet, the reproducing arrangement will be capable of retrieving the timing information and recreating the MPEG information signal using said timing information.

It should be noted that the measures discussed above can be applied solely or in combination with one another in the recording arrangement. As a result, record carriers will be obtained having signal blocks stored in tracks on the record carrier, the signal blocks having a first block section which comprises a synchronization signal and a second block section which comprises a number of channel bytes, x transport packets of the MPEG information signal being stored in the second block sections of a group of y signal blocks of the channel signal. Further in accordance with the invention, the second block section of at least the first signal block of the group of y signal blocks comprise a third block section for storing identification information identifying the signal block as being the first signal block of the group of y signal blocks, or said identification information is sequence number information and the second block sections of a group of y signal blocks all comprise a third block section for storing sequence number information relating to the sequence numbers of the signal blocks, or the second block sections of the signal blocks each comprise a third block section for storing identification information indicating whether the signal block comprise 'normal play' data or 'trick mode' data, or the second block sections of at least those signal blocks in a group of y signal blocks that comprises the start portion of a transport packet comprise a third block section for storing identification information relating to a transport packet sequence number corresponding to the transport packet having its start portion stored in the second block section of the signal block, or the second block sections of at least those signal blocks in a group of y signal blocks that comprises the start portion of a transport packet comprise a third block section for storing the timing information for said transport packet having its start portion stored in the second block section of the signal block, or third block sections comprise information resulting from a combination of one or more of the measures listed above.

It will be apparent that a reproducing arrangement will be needed which is adapted to each specific embodiment of the recording arrangement, so as to enable a reproduction of the MPEG information signal recorded on the record carrier. Such reproducing arrangement is the subject of the claims directed to the reproduction arrangement.

The invention also includes the method of transmitting timing critical data over an asynchronous channel without changing any of the critical timing information; in other words, to make the asynchronous channel transparent for the timing critical data. This is achieved, broadly speaking, by tagging one or more of the transmission units making up the data with timing information before sending it over the channel, and then using the tagged information to recreate the proper data timing at the other end of the channel. As an example, the data can be an MPEG information signal, and the channel a DVCR. But the invention is not limited to this application and can also be applied to asynchronous channels such as a computer network, a telephone network or a digital interface.

SUMMARY OF THE DRAWINGS

These and other aspects of the invention will be apparent from and elucidated with reference to the embodiments described hereafter and the accompanying drawings, in which:

FIG. 8a shows an example of an original serial MPEG data stream having a constant bit rate and packet rate, FIG. 8b the MPEG data stream that is recorded, and FIG. 8c the regenerated replica of the original serial MPEG data stream, FIG. 13a shows an example of an original serial MPEG data stream having a variable bit rate and packet rate, FIG. 13b the MPEG data stream that is recorded, and FIG. 13c the regenerated replica of the original serial MPEG data stream.

DETAILED DESCRIPTION OF PREFERRED EMBODIMENT

Figure 1:
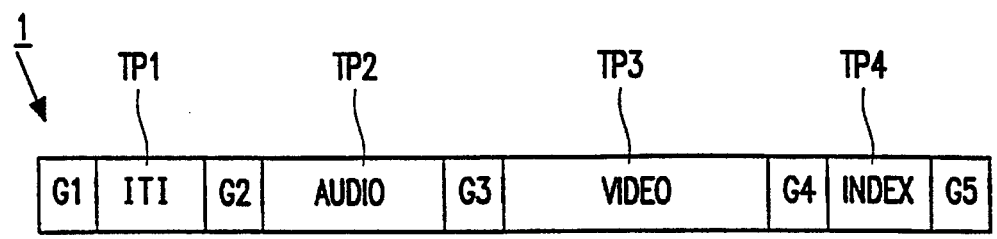
FIG. 1 shows the track format of a record carrier of the DVC-type.

FIG. 1 shows the format of the signals as they are recorded in a track on a magnetic record carrier by means of a helical scan video recorder of the DVC type. The left end of the track 1 in FIG. 1 is the start of the track and the right end of the track is the terminal part of the track. The track comprises a number of track parts. The track part denoted by G1 is the preamble track part. An example of the preamble track part G1 has been described extensively in EP-A492,704.

The track part G1 is followed by tracking tone recording part TP1, which is denoted by ITI (insert timing information) track part and which contains a tracking tone, synchronization information and identification (or timing) information. Further explanation of the contents of the ITI track can be found in EP-A93.201.263.

The track part TP1 is followed by an edit gap G2. The edit gap G2 is followed by the track part TP2, which is the audio signal recording sector and comprises digital audio information. The edit gap G3 is followed by a track part TP3 which is the video signal recording sector and comprises digital video information. The edit gap G4 is followed by a track part TP4, denoted by INDEX and which comprises among other items subcode information, such as absolute and/or relative time information and a table of contents (TOC). The track is terminated by the track part G5. It can be said that the sequence order in which the parts TP1, TP2 and TP3 occur in the tracks may be different.

Figure 2:
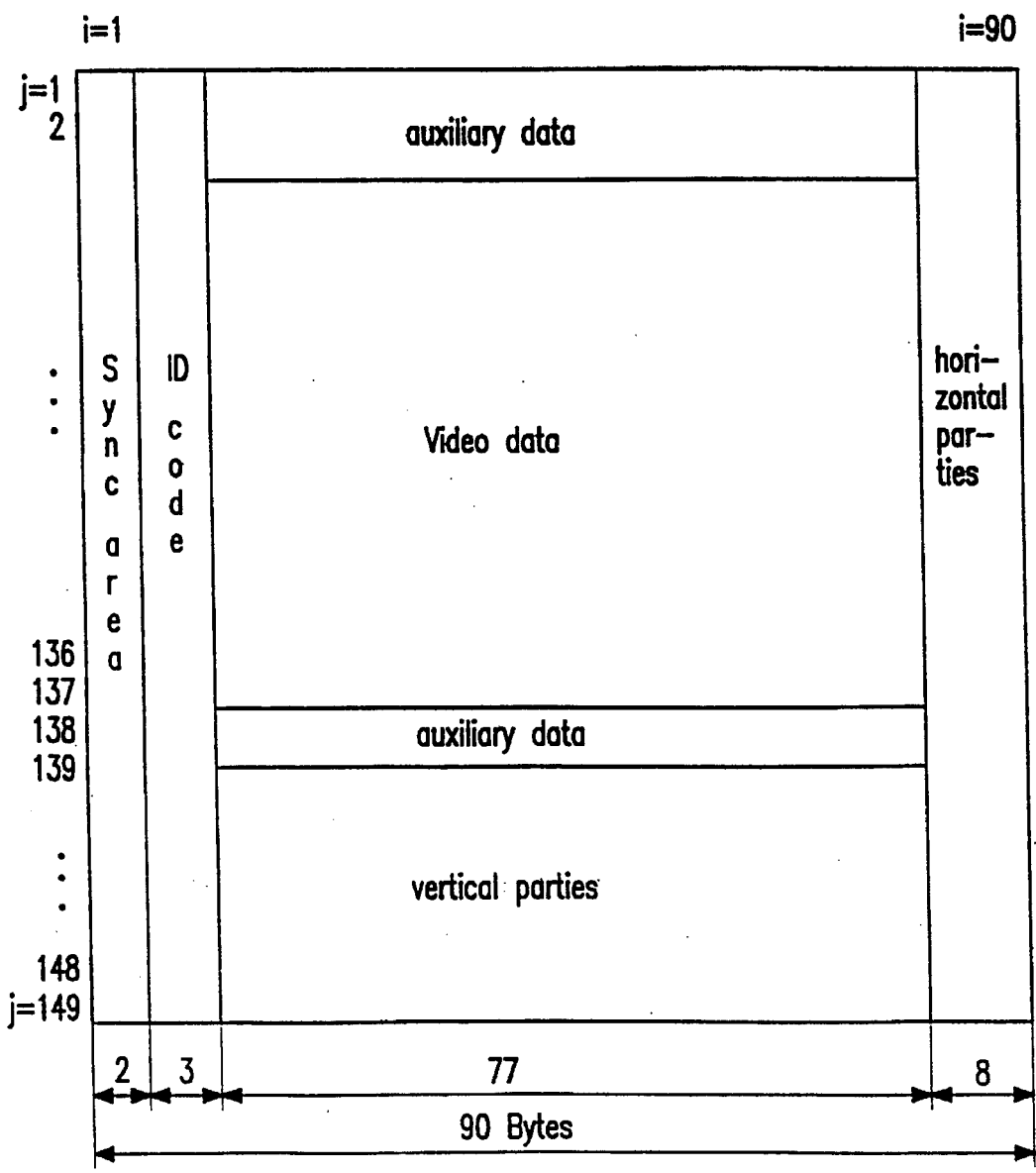
FIG. 2 shows schematically the contents of the video signal recording sector in the track of FIG. 1.

The contents of the video signal recording sector TP3 is given in FIG. 2. FIG. 2 in fact shows schematically a number of 149 horizontal lines, denoted by j=1 to j=149, having bytes of information stored in it. The 149 lines are in fact 149 signal blocks (or sync blocks) that are stored sequentially in the video signal recording sector TP3. 90 bytes of information, denoted by i=1 to i=90, are stored in each signal block.

The first two bytes (i=1 and i=2) of each signal block form a synchronization pattern of 2 bytes long. The following three bytes in each signal block form an ID code, comprising among other items information which indicates the sequence number of the signal block in the video signal recording part TP3. The last eight bytes in the signal blocks form horizontal parity information. Vertical parity information is stored in the storage locations i=6 to i=82 inclusive of the last 11 signal blocks.

Bytes of video signal information are stored in the storage locations i=6 to i=82 inclusive of the signal blocks having the sequence numbers j=3 to j=137 inclusive. Bytes of auxiliary data are stored in the storage locations i=6 to i=82 inclusive of the signal blocks having the sequence numbers j=1, 2 and 138. The signal blocks are stored sequentially in the video signal part TP3, starting with the signal block denoted j=1, followed by the signal block denoted j=2, and so on until the signal block denoted j=149.

The auxiliary data for storage in the signal blocks denoted j=1, 2 and 138 can be teletext data or control data.

It should be noted here that it can be specified that the auxiliary data will be stored in a different location in the memory. Reference is made in this respect to EP-A492,704 FIG. 13, where the auxiliary data is stored in the memory part denoted by III.

Figure 3:
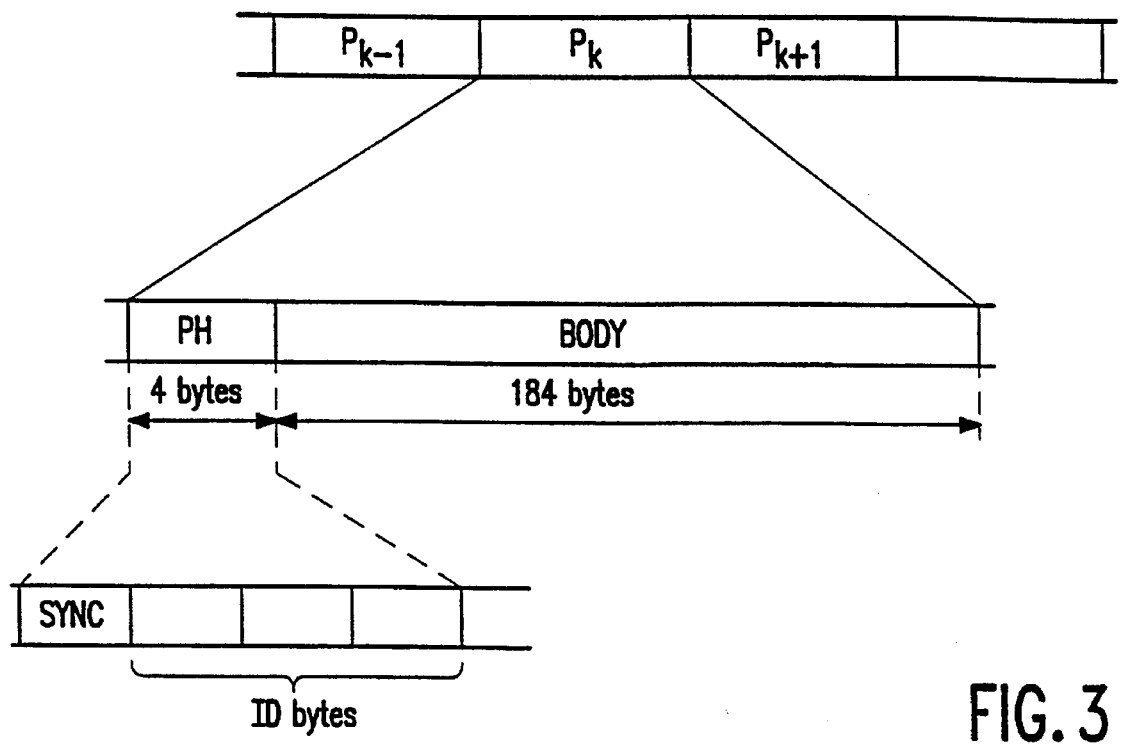
FIG. 3 shows schematically the serial MPEG data stream and the format of the transport packets included in the serial MPEG data stream.

FIG. 3 shows schematically the MPEG data stream applied to a recording arrangement in accordance with the invention. The MPEG data stream comprises subsequent transport packets, denoted by . . . , $P_{k-1}$, Pk, $P_{k+1}$, . . . The packets each comprise a packet header portion PH of 4 bytes long and a body portion of 184 bytes long. The transport packets can be transmitted in a data stream having a constant bit rate. This means that the packets are equally long, viewed in time, and are received at a fixed packet rate. The transport packets may also be transmitted in a data stream having a variable bit rate. In this situation, the packets need not be of the same length, viewed in time, and may be received with a variable packet rate. The first byte in the packet header PH is a sync byte. The sync byte is identical for all the transport packets. The other three bytes in the header comprise ID information, such as a packet identifier. For a further explanation of the contents of the ID information, reference is made to the draft Grand Alliance HDTV System Specification discussed above specifically chapter V, paragraph 5.1 on page 27.

The body portion of the transport packets comprise each 184 bytes for storing the video and audio information that should be transmitted in accordance with the MPEG format. The body portion of one transport packet can store either audio information corresponding to a certain video signal, or the video signal. Further, in the case that a number of video programs are transmitted via. the MPEG data stream, the body portion stores a video signal corresponding to one of such video programs transmitted.

One aspect of the invention now aims at recording the video signal, and the corresponding audio signal as may be appreciated, corresponding to one of those video programs transmitted via the MPEG data stream, on the record carrier having the track format disclosed in FIG. 1 and 2. Information stored in the transport packets should be stored in the signal blocks, more specifically, in the 135 signal blocks denoted j=3 to j=137 in the video signal recording part TP3 of a track. The two sync bytes, denoted i=1 and 2, the ID information in the form of the three ID bytes denoted i=3, 4 and 5, as well as the 8 horizontal parity bytes, denoted by i=83 to 90, in those signal blocks are required for a correct recording and reproduction. As a consequence, only the 77 bytes, denoted by i=6 to 82, in the signal blocks denoted by j=3 to 137, are available for the storage of the transport packets of the MPEG information. The part of the signal blocks formed by the 77 bytes i=6 to 82 is defined as being the second block sections of the signal blocks.

As synchronization during recording and reproduction is assured by means of the sync words in each of the signal blocks, there is no need for transmitting the sync bytes of the transport packets via the record carrier. So, before storing the information comprised in the transport packets in the second block sections of the signal blocks denoted by j=3 to 135, the sync byte of all the transport packets is thrown away. As a result only 187 bytes of information should be stored in the signal blocks for each transport packet.

Figure 4:
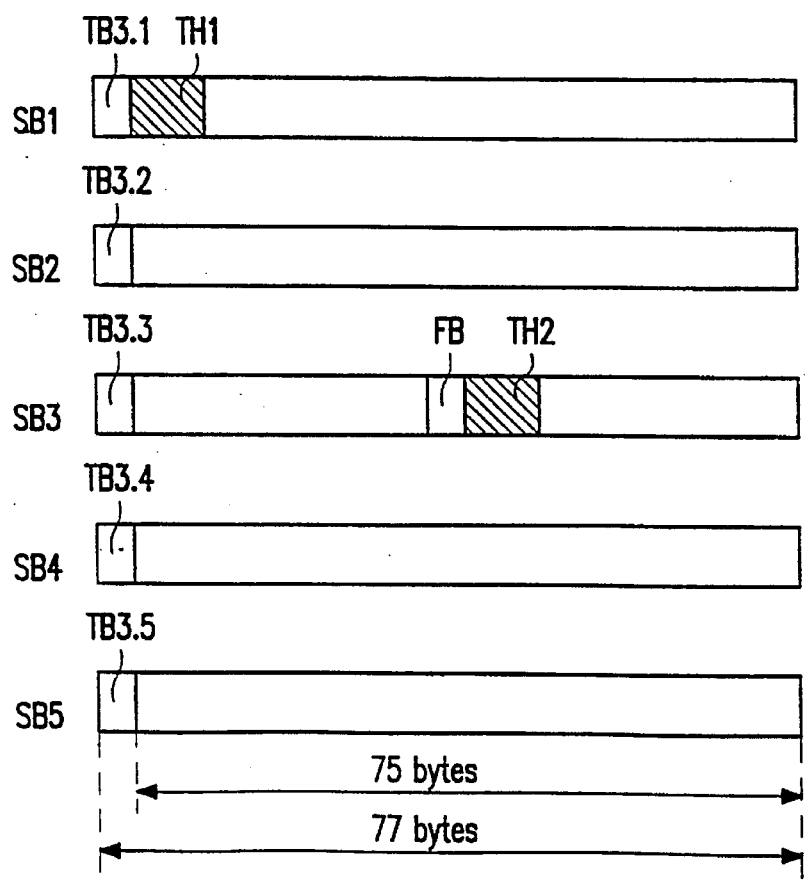
FIG. 4 shows an example of the storage of two transport packets in five signal blocks.

A simple calculation makes clear that two transport packets can be stored in five signal blocks, and that 11 bytes remain available for the storage of other information. FIG. 4 gives an example of how the two transport packets can be stored in the second block sections of the group of five signal blocks, denoted SB1 to SB5 in FIG. 4. FIG. 4 only shows the contents of the second block sections of length of 77 bytes included in the signal blocks. As can be seen in FIG. 4, the 11 bytes are divided over the group of five signal blocks such that each second block section comprises a third block section TB3.1 to TB3.5, of two bytes long at the beginning of the second block sections of the five signal blocks SB1 to SB5 respectively, and a third block section in the form of one byte, denoted by FB, is available in the third signal block SB3. The 187 bytes of the first transport packet are stored in the signal blocks SB1, SB2 and SB3, where the three ID bytes of the packet header of the first transport packet, indicated by TH1, are stored first in the signal block SB1, directly after the third block section TB3.1, and next the first 72 first bytes in the body of the first transport packet are stored thereafter in the second block section of the signal block SB1. The next 75 bytes in the body of the first transport packet are stored in the second block section of the signal block SB2, after the third block section TB3.2, and the last 37 bytes in the body of the first transport packet are stored in the second block section of the signal block SB3, after the third block section TB3.3.

Next comes the byte FB, which indicates the boundary between the information of the first and second transport packets stored in the group of five signal blocks. The 187 bytes of the second transport packet are stored in the signal blocks SB3, SB4 and SB5, where the three ID bytes of the packet header of the second-transport packet, indicated by TH2, are stored first in the signal block SB3, directly after the byte FB. Next the first 34 first bytes in the body of the second transport packet are stored thereafter in the second block section of the signal block SB3. The next 75 bytes in the body of the second transport packet are stored in the second block section of the signal block SB4, after the third block section TB3.4, and the last 75 bytes in the body of the second transport packet are stored in the second block section of the signal block SB5, after the third block section TB3.5.

It should be noted that also another spreading of the 11 available bytes over the five signal blocks is possible. As an example, the 11 bytes could have been split into two third block sections, the one third block section having as an example 6 bytes and being located at the beginning of the first signal block SB1, and the other third block section of 5 bytes long being located in the third signal block and indicating the boundary between the two transport packets stored in the five signal blocks. Another example could have been to have a third block section located at the beginning of the signal blocks SB1 and SB3 and another third block section in the third signal block SB3, indicating the boundary between the two transport packets stored in the five signal blocks, where the third block section in the signal block SB1 can have eg. 4 bytes, the first third block section in the signal block SB3 eg. 3 bytes and the third block section in signal block SB3 indicating the said boundary being eg. 4 bytes long.

The third block sections TB3.1 to TB3.5 can be used for the storage of additional information. As a first example, the third block section TB3.1 can include an indication identifying the signal block SB1 as being the first signal block in a group of five signal blocks. This can be realized by storing in one specific bit location in the third block section TB3.1 a bit value of a certain polarity, such as '0' or '1'. In the same bit locations in the third block sections TB3.2 to TB3.5 a bit value of the opposite polarity should be stored. In another example, sequence number information, eg. sequence numbers running from 1 to 5 can be stored in the third block sections TB3.1 to TB5 respectively, of the group of five signal blocks, where the third block section TB3.1 has the sequence number '1' and the third block section TB3.5 has the sequence number '5' stored in them. Three specific bit locations in the third block sections TB3.1 to TB3.5 are required to stored the sequence numbers. The sequence numbers can however also run across the group boundaries so as to identify a larger sequence of signal blocks, eg within one track, or even in more than one track.

In another example, one specific bit location in the third block sections TB3.1 to TB3.5 of a group of five signal blocks can be used to store either a bit value of one polarity, such as '0' or '1', so as to indicate that the video data included in the signal block is so-called 'normal play' data, or a bit value of the opposite polarity, so as to indicate that the video data included in the signal block is so-called 'trick play' video data. The use of the 'normal play' video data and 'trick play' video data will be explained later.

In again another example, sequence numbers are generated in response to transport packets in the MPEG data stream that is received. As has been explained earlier, such MPEG data stream can include more than one video program. As the bit rate of the MPEG data stream is normally higher than the bit rate of the signal that can be recorded, only one video program may be selected from the serial MPEG data stream for recording. Selection of one video program means selection of transport packets out of the data stream of the MPEG data stream that comprise the information relating to said video program, and deleting the other packets. Consequently the serial array of transport packets that will be recorded have sequence numbers that not necessarily are next higher numbers, as those sequence numbers of the transport packets deleted are not present. When storing the sequence numbers in the third block sections, those sequence numbers can be retrieved upon reproduction. By checking the subsequent sequence numbers retrieved, it can be established whether the original MPEG data stream applied to the recording arrangement, originally included deleted transport packets between two transport packets reproduced. If so, a replica of the original MPEG data stream can be regenerated by inserting one or more dummy packets between the two transport packets reproduced.

In a related example, timing information is stored in the third block sections, for the same reason as given above, namely for regenerating a replica of the original MPEG data stream, in the case that such data stream is a data stream having a variable bit rate.

It will be clear that also a combination of the additional information described above can be included in the 11 bytes available for the storage of such information in a group of five signal blocks.

As an example, it has been made clear above that a 3-bit word is needed in the third block sections to indicate the sequence numbers of the signal blocks in the group of five signal blocks. More specifically, the 3-bit words '000', '001', '010', '011' and '100' could have been used to identify the sequence. That means that the 3-bit words '101', '110' and '111' remain available for a further identification. As an example, the 3-bit words '101' and '110' could be used to identify either 'normal play' data or 'trick mode' data.

Figure 5:
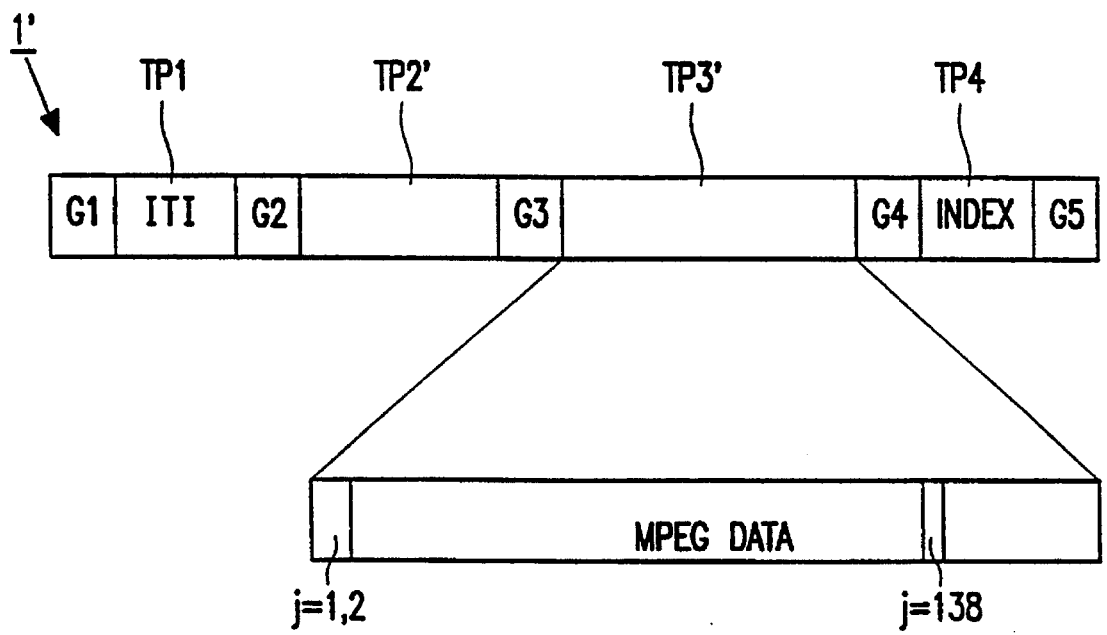
FIG. 5 shows the contents of the track when having MPEG information recorded in it.

FIG. 5 shows the track format of the track if the MPEG information has been stored in the second block portions of the signal blocks of the track portion TP3 of FIG. 1, now denoted by track portion TP3'. FIG. 5 shows the first two signal blocks (j=1,2) in the track portion TP3' that still includes the auxiliary data, followed by 135 signal blocks (j=3 to j=137) now comprising the MPEG information and the additional information described above. Next one signal block (j=138) also comprising the auxiliary data, followed by 11 signal blocks comprising the parity information. The storage of the MPEG information and the additional information in the 135 signal blocks may require an additional error encoding step to be carried out on the said information, resulting in additional parity information that should also be stored in a track. As the MPEG information, which includes video information and corresponding audio information, is stored in the signal 135 blocks in the track portion TP3', there is no need for storing audio information in the track portion TP2 of FIG. 1. This portion, now denoted by TP2' in FIG. 5, can be used to store the parity information resulting from the additional error encoding step.

Figure 6:
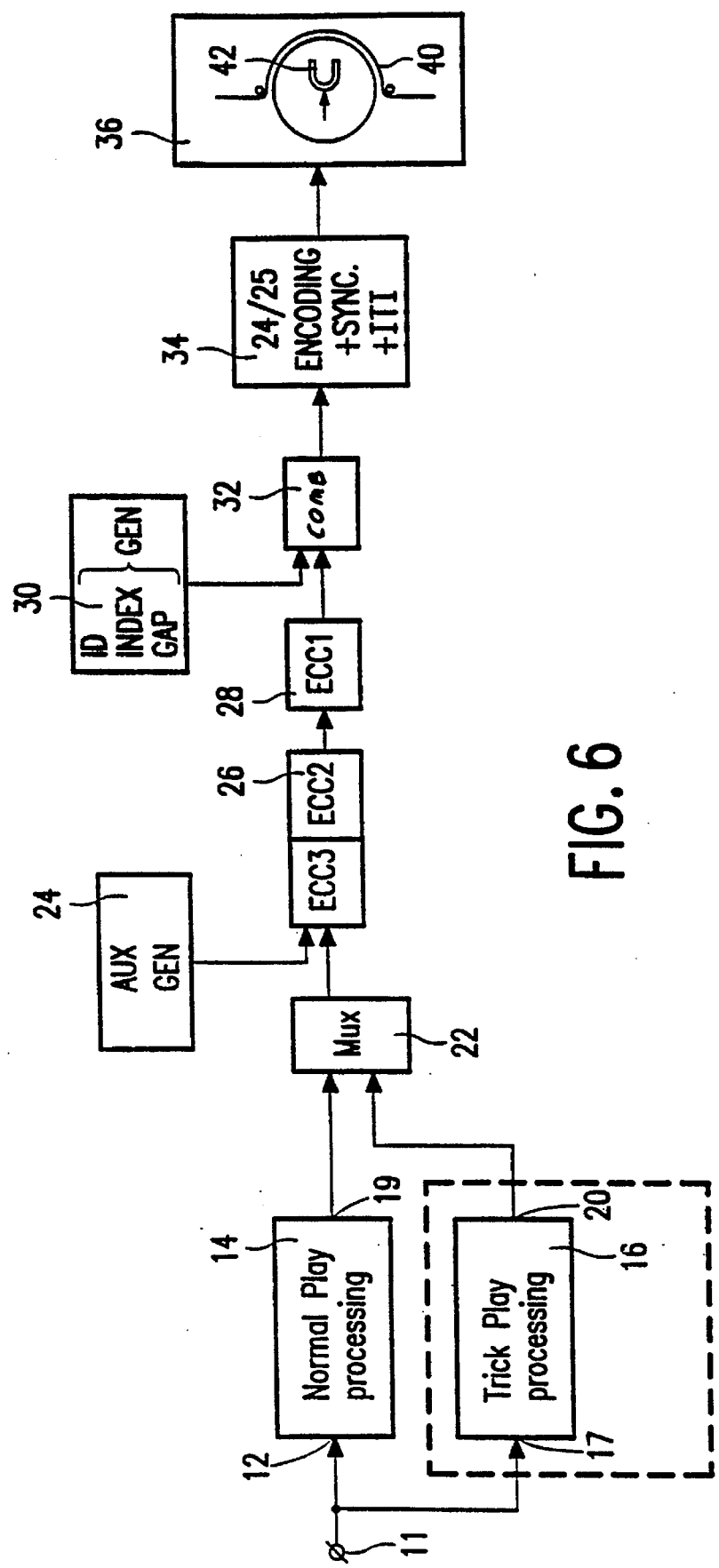
FIG. 6 shows one embodiment of the recording arrangement.

FIG. 6 shows schematically one embodiment of the recording arrangement. The recording arrangement comprises an input terminal 11 for receiving the MPEG serial data stream for recording transport packets included in the data stream in the signal blocks of the track portions TP3' of the tracks. The input terminal 11 is coupled to an input 12 of a 'normal play' processing unit 14. Optionally, a 'trick play' processing unit 16 is provided having an input 17 also coupled to the input terminal 11. Outputs 19 and 20 of the 'normal play' processing unit 14 and the 'trick play' processing unit 16 (if present) are coupled to corresponding inputs of a multiplexer 22. It will be clear that in the absence of the 'trick play' processing unit 16, also the multiplexer 22 will be absent.

An auxiliary signal generator 24 is present for supplying the auxiliary signal information for storage in the signal blocks denoted by j=1,2 and 138, see FIG. 2. Outputs of the multiplexer 22 and the generator 24 are coupled to corresponding inputs of an error correction encoder unit 26. The error correction encoder unit 26 is capable of carrying out a first error correction encoding step, denoted ECC3, and a second error correction encoding step, denoted ECC2. Next a third error correction encoding step, denoted ECC1, is carried out in an error correction encoder unit 28.

The recording arrangement further comprises a generator 30 for adding the ID information in the bytes i=3, 4 and 5 of the signal blocks, see FIG. 2, for adding the index information for storage in the track portion TP4, see FIG. 5, and the gap information for realizing the gaps G1 to G5, see FIG. 5. After combination of the signals in the combining unit 32, the combined signal is applied to a unit 34, in which an encoding is carried out where each time 24-bit words of the incoming bitstream are converted into 25-bit words, where a sync word is added so as to obtain the first two bytes (i=1,2) in the signal blocks and where the ITI information is added for storage in the track portion TP1.

The 24-to-25 encoding carried out in the encoding unit 34 is well known in the art. Reference is made in this respect to U.S. Pat. No. 5,142,421. This document also describes a way of adding the sync word to the data stream.

An output of the encoding unit 34 is coupled to an input of a writing unit 36, in which the data stream obtained with the encoding unit 34 is recorded in the slant tracks on the record carrier, by means of at least one write head 42.

The first error correction encoding step, denoted ECC3, is required so as to realize the additional error protection of the MPEG information to be recorded on the record carrier, and results in parity information that will be stored in the track portion TP2', as has been explained previously. The second error correction encoding step, denoted ECC2, results in the vertical parity information that will be stored in the 11 signal blocks (j=139 to 149) of the track portion TP3', see FIGS. 2 and 5. The third error correction encoding step, denoted ECC1, results in the horizontal parity information that will be stored in the last 8 bytes of the signal blocks in the track portion TP3', see FIG. 2 and 5.

Before a further description of the 'normal play' processing unit 14 and the 'trick play' processing unit 16 of the recording arrangement of FIG. 6 will be given, first a schematic description of the reproducing arrangement will be given. This has the advantage that, when further describing certain measures applied in the processing units 14 and 16, a direct relation can be given to the advantages and consequences of those measures during reproduction.

Figure 7:
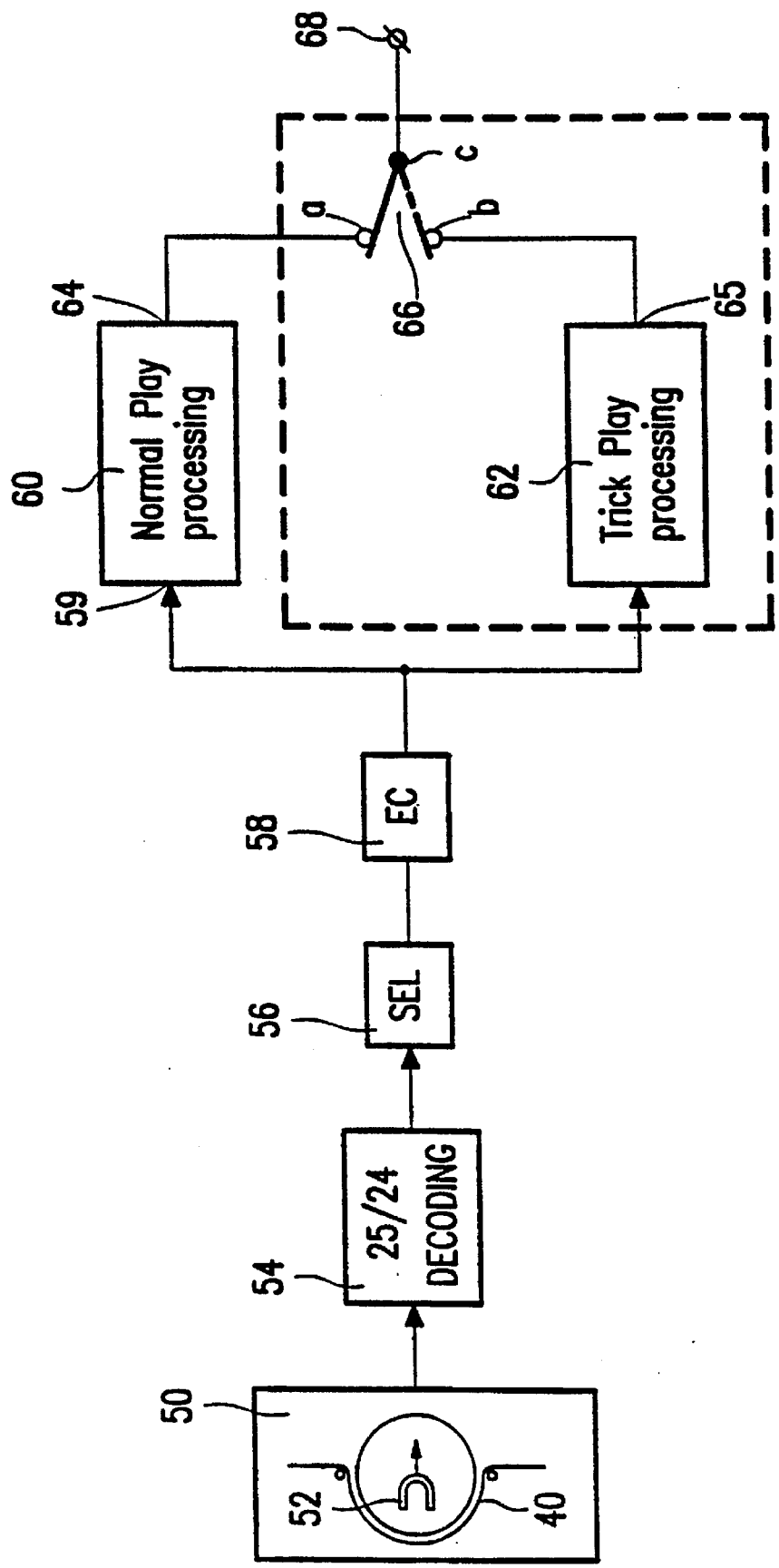
FIG. 7 shows one embodiment of the reproducing arrangement.

FIG. 7 shows schematically an embodiment of a reproduction arrangement for reproducing information from the record carrier 40 obtained with the recording arrangement of FIG. 6. The reproduction arrangement comprises a reading unit 50, having at least one reading head 52 for reading information from the slant tracks on the record carrier 40. An output of the reading unit 50 is coupled to an input of a decoding unit 54, which carries out a 25-to-24 decoding on the signal read out, so as to convert 25-bit words in the incoming data stream into 24-bit words. Next, after having selected out in the selector unit 56 all those information that is not required for recreating a replica of the original MPEG data stream, an error correction is carried out in the error correction unit 58. It will be clear that the error correction carried out has three steps. One error correction step based on the ECC1, using the horizontal parities, see FIG. 2, a second error correction step based on ECC2, using the vertical parities, and a third error correction step based on ECC3, using the parity information stored in the track portion TP2', see FIG. 5.

The output terminal of the error correction unit 58 is coupled to an input of a 'normal play' processing unit 60. Optionally, a 'trick play' processing unit 62 is provided having an input also coupled to the output of the error correction unit 58. Outputs 64 and 65 of the 'normal play' processing unit 60 and the 'trick play' processing unit 62 (if present) are coupled to corresponding terminals a and b respectively of a switch 66, a c-terminal of which is coupled to an output terminal 68. It will be clear that in the absence of the 'trick play' processing unit 62, also the switch 66 will be absent. If the reproducing arrangement is switched into a 'normal play' reproduction mode, this means that the record carrier is transported at a nominal speed, that the 'normal play' processing unit 60 is enabled and the switch 66 is switched into the position a-c. If the reproducing arrangement is switched into a 'trick play' reproduction mode, also called 'feature mode', this means that the record carrier is transported at a speed other than the nominal speed, that the 'trick play' processing unit 62 is enabled and the switch 66 is switched into the position b-c.

Now a further discussion will be given of the processing units 14 and 16 of FIG. 6, in combination with the processing units 60 and 62 of FIG. 7.

It is assumed that the recording arrangement is capable of selecting one video program and its corresponding audio signal from the serial MPEG data stream that is applied to the input terminal 11, in response to a selection signal supplied to the arrangement by a user. As has been said earlier, only those transport packets in the serial MPEG stream should be selected that include information relating to the video program selected. FIG. 8a shows the serial MPEG data stream as a function of time comprising the transport packets denoted $P_k$. It should be noted that the transport packets of the MPEG data stream do not comprise a packet number. The packet number k, given to the packets in FIG. 8a, are therefore the numbers that will be generated by the packet number generator 86 of FIG. 9 that will be discussed later.

Selecting only those packets of the packets $P_k$ of FIG. 8a that include information relating to the video program selected means, as an example, that the packets $P_{k-4}$, $P_{k-1}$, $P_{k+2}$, $P_{k+4}$, $P_{k+8}$ will be selected and that the intermediate packets will be thrown away. As a result, a data stream has been obtained in the recording arrangement for recording on the record carrier, as shown in FIG. 8b, which shows the data stream as a function of time. No conclusion should be drawn from the timing in the time scales of FIG. 8a and 8b, nor from the relative location between the time scales in FIG. 8a and 8b. This for the reason that, as has been said previously, the bit rate of the original MPEG data stream (FIG. 8a) is different from (higher than) the bit rate with which the selected transport packets will be recorded on the record carrier.

Figure 9:
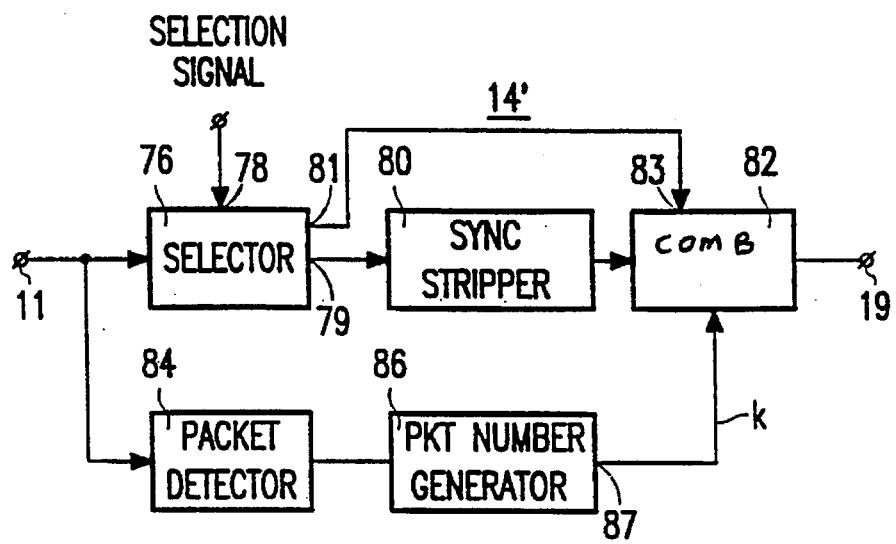
FIG. 9 shows one embodiment of the 'normal play' processing unit in the recording arrangement of FIG. 6.

An embodiment of the 'normal play' processing unit 14 for recording a data stream as shown in FIG. 8b is shown schematically in FIG. 9. The embodiment denoted 14' in FIG. 9, comprise a selector unit 76 having an input coupled to the input 11 of the unit 14'. The selector unit 76 has another input 78 for receiving the selection signal supplied by the user. An output 79 of the selector unit 78 is coupled to the input of a sync stripper 80, whose output is coupled to a signal combining unit 82. Further, an output 81 of the selector 76 is coupled to a control input 83 of the combining unit 82, for supplying a control signal to the combining unit 82.

The input 11 is further coupled to an input of a packet detector 84, which has an output coupled to an input of a packet number generator 86. An output of the generator 86 is coupled to a second input of the combining unit 82.

The selector 76 selects the transport packets $P_{k-4}$, $P_k$, $P_{k+2}$, $P_{k+4}$, $P_{k+8}$ from the serial MPEG data stream applied to the input 11 in response to the selection signal received via the input 78. The packets selected are applied to the sync stripper 80, in which the first sync byte in the packet header PH, see FIG. 3, is deleted from the packets, in accordance with a description given previously. The packet detector 84 detects the receipt of each packet in the original serial MPEG data stream applied to the input 11 and generates a clock impulse for each packet detected. The generator 86 includes a counter that counts up under the influence of the clock impulses applied to the generator 86. As a consequence a next higher count number is applied to the output for each clock impulse received. At the output 87 of the generator 86 thus appear count numbers ... k−4, k−3, k−2, k−1, k, k+1, k+2, k+3, k+8, ... Under the influence of the control signal applied to the control input 83 of the combining unit 82, the control unit combines the packets $P_{k-4}$, $P_{k-1}$, $P_k$, $P_{k+2}$, $P_{k+4}$, $P_{k+8}$ selected by the selector 76 as well as the count numbers k−4, k−1, k, k+2, k+4, k+8 out of the count number stream supplied by the packet number generator 86 for storage into the signal blocks.

Figure 10:
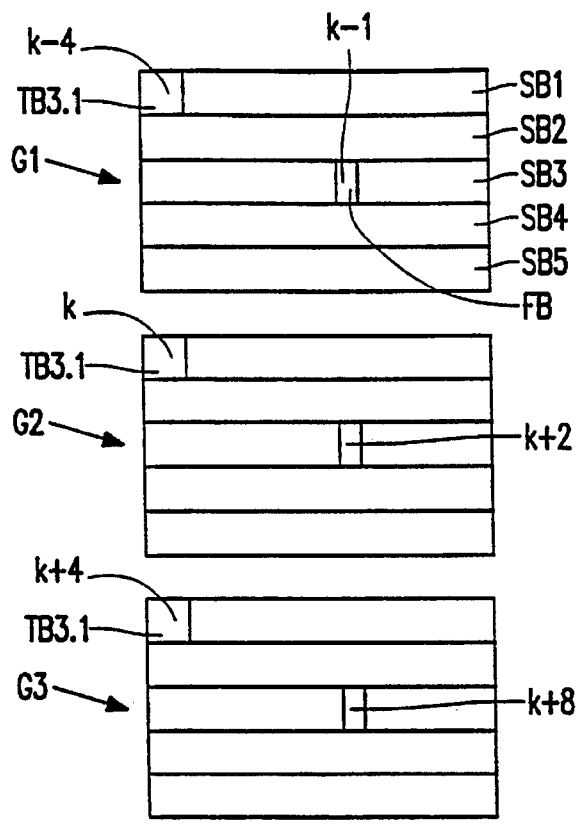
FIG. 10 shows one example of a sequence of three groups of five signal blocks each.

FIG. 10 shows an example how the transport packets and the corresponding packet numbers can be stored in the groups of five signal blocks. FIG. 10 shows three subsequent groups of five signal blocks, denoted G1, G2 and G3 in which the information is stored. In the third block section TB3.1 of the first signal block SB1 of the group G1, the packet number k−4 is stored and the information comprised in the packet $P_{k-4}$ is stored thereafter in the signal blocks SB1, SB2 and SB3 of the group G1. In the third block section denoted FB of the third signal block SB3 of the group G1, the packet number k−1 is stored and the information comprised in the packet $P_{k-1}$ is stored thereafter in the signal blocks SB3, SB4 and SB5 of the group G1. In the third block section TB3.1 of the first signal block SB1 of the group G2, the packet number k is stored and the information comprised in the packet $P_k$ is stored thereafter in the signal blocks SB1, SB2 and SB3 of the group G2. In the third block section denoted FB of the third signal block SB3 of the group G2, the packet number k+2 is stored and the information comprised in the packet $P_{k+2}$ is stored thereafter in the signal blocks SB3, SB4 and SB5 of the group G2. In the third block section TB3.1 of the first signal block SB1 of the group G3, the packet number k+4 is stored and the information comprised in the packet $P_{k+4}$ is stored thereafter in the signal blocks SB1, SB2 and SB3 of the group G3. In the third block section denoted FB of the third signal block SB3 of the group G3, the packet number k+8 is stored and the information comprised in the packet $P_{k+8}$ is stored thereafter in the signal blocks SB3, SB4 and SB5 of the group G3. As long as the number of bits of the packet number is smaller than or equal to 8, the packet number will fit in the third block section FB, which is 1 byte long.

Figure 11:
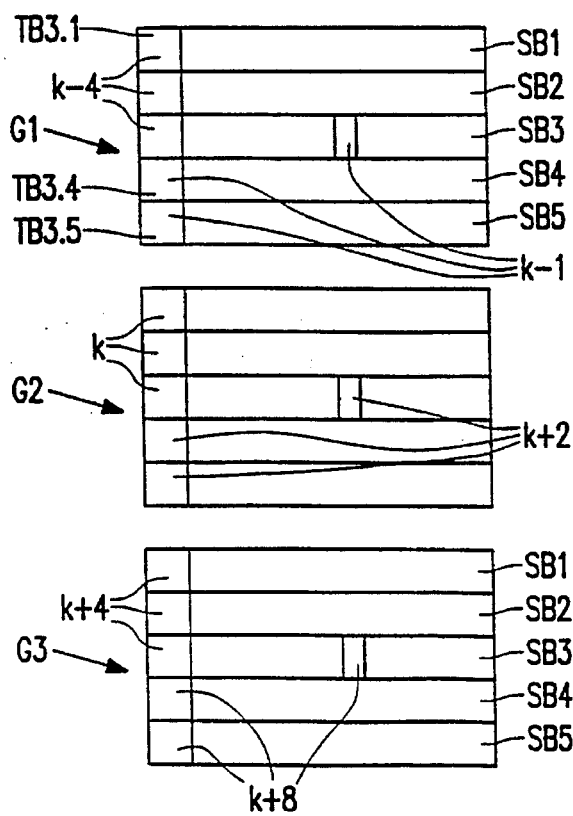
FIG. 11 shows another example of a sequence of three groups of five signal blocks each.

Another example of storing the packet numbers in the third block sections is given in FIG. 11. In the third block sections TB3.1, TB3.2 and TB3.3 of the signal blocks SB1, SB2 and SB3 respectively of the group G1, the packet number k−4 is stored and the information comprised in the packet $P_{k-4}$ is stored in the signal blocks SB1, SB2 and SB3 of the group G1, as explained previously with reference to FIG. 4. In the third block section denoted FB of the third signal block SB3 of the group G1, as well as in the third block sections TB3.4 and TB3.5 of the signal blocks SB4 and SB5 of the group G1, the packet number k−1 is stored and the information comprised in the packet $P_{k-1}$ is stored in the signal blocks SB3, SB4 and SB5 of the group G1, as explained previously with reference to FIG. 4. In the third block sections TB3.1, TB3.2 and TB3.3 of the signal blocks SB1, SB2 and SB3 respectively of the group G2, the packet number k is stored and the information comprised in the packet $P_k$ is stored in the signal blocks SB1, SB2 and SB3 of the group G2. In the third block section denoted FB of the third signal block SB3 of the group G2, as well as in the third block sections TB3.4 and TB3.5 of the signal blocks SB4 and SB5 respectively of the group G2, the packet number k+2 is stored and the information comprised in the packet $P_{k+2}$ is stored in the signal blocks SB3, SB4 and SB5 of the group G2. In the third block sections TB3.1, TB3.2 and TB3.3 of the signal blocks SB1, SB2 and SB3 of the group G3, the packet number k+4 is stored and the information comprised in the packet $P_{k+4}$ is stored in the signal blocks SB1, SB2 and SB3 of the group G3. In the third block section denoted FB of the third signal block SB3 of the group G3, as well as in the third block sections TB3.4 and TB3.5 of the signal blocks SB4 and SB5 of the group G3, the packet number k+8 is stored and the information comprised in the packet $P_{k+8}$ is stored in the signal blocks SB3, SB4 and SB5 of the group G3.

Instead of storing the packet number k−4 in the third block section TB3.3 of the signal block SB3 in group G1, one could have stored the packet number k−1 in said third block section. Instead of storing the packet number k in the third block section TB3.3 of the signal block SB3 in group G2, one could have stored the packet number k+2 in said third block section. Instead of storing the packet number k+4 in the third block section TB3.3 of the signal block SB3 in group G3, one could have stored the packet number k+8 in said third block section.

Figure 12:
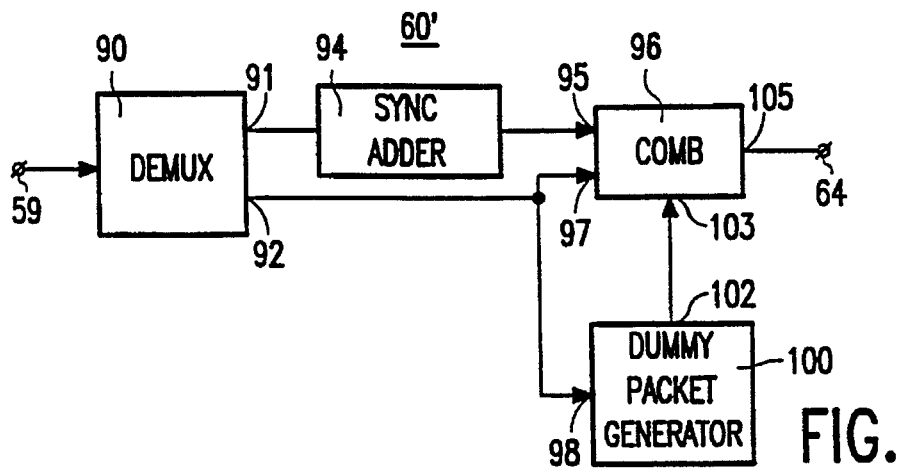
FIG. 12 shows one example of the 'normal play' processing unit in the reproducing arrangement of FIG. 7.

FIG. 12 schematically shows an embodiment of the 'normal play' processing unit 60 of the reproducing arrangement of FIG. 7, for regenerating a replica of the original MPEG data stream of FIG. 8a from the data stream as shown in FIG. 8b, using the packet number information also stored in the signal blocks, in the way described above. The regenerated replica of the MPEG data stream is shown in FIG. 8c. The embodiment of the 'normal play' processing unit of FIG. 12, denoted by 60', comprises a demultiplexer 90 having its input coupled to the input 59 of the processing unit 60' for receiving the subsequent groups of signal blocks, such as the groups G1, G2 and G3 of FIG. 10 or 11, and for retrieving therefrom the packets that are supplied to an output 91 and for retrieving the array of packet numbers . . . k−4, k−1, k, k+2, k+4, k+8 . . . from the third block sections in the signal blocks, and for supplying the said array of packet numbers to an output 92. The packets retrieved are supplied to a sync adder circuit 94 in which the one byte long packet sync signal is reinserted as first byte in all the packets. The packets thus obtained are supplied to an input 95 of a combining unit 96. The output 92 of the demultiplexer 90 is coupled to inputs 97 and 98 of the combining unit 96 and a dummy packet generator 100 respectively. An output 102 of the dummy packet generator 100 is coupled to an input 103 of the combining unit 103. An output 105 of the combining unit 96 is coupled to the output 64 of the 'normal play' processing unit 60'.

Let us now assume that the packet $P_{k-4}$ and the packet number k−4 are retrieved from the first group G1 of five signal blocks, and are applied to the combining unit 96 and the dummy packet generator 100. This results in the packet $P_{k-4}$ being supplied to the output 105 by the combining unit 96. Next, the packet $P_{k-1}$ and the packet number k−1 are retrieved from the group G1 and are applied to the combining unit 96 and the dummy packet generator 100. It is established by means of a comparator and/or a subtractor (not shown) that the packet number k−1 is not the next higher packet number of the packet number k−4, received previously, and that two packet numbers are missing. As a result, the dummy packet generator 100 generates twice a dummy packet of the same length as the other packets in the data stream, and the combining unit 96 inserts those two dummy packets in the serial data stream, directly after the packet $P_{k-4}$, see FIG. 8c. Next, the combining unit 96 inserts the packet $P_{k-1}$ into the serial data stream.

It should be noted here, that there is no specific need for the generator 100 to be explicitly a dummy packet generator. It is also possible that the generator 100 is a dummy info generator that generates dummy info of a certain length in time, this length of time being equal to the length of time of a packet or equal to a multiple of the length of time of a packet.

The packet $P_k$ is the next packet that is retrieved by the demultiplexer 90, and the packet is supplied, after the addition of the sync byte, to the input 95 of the combining unit 96. The packet number k is supplied to the inputs 97 and 98 of the combining unit 96 and the dummy packet generator 100. As the packet number k is the next higher packet number to packet number k−1, no dummy packet is generated, and the packet $P_k$ is supplied to the output 105.

Next the packet $P_{k+2}$ is retrieved. After comparison of the packet number k+2 with the previous packet number k retrieved, it appears that one dummy packet must be inserted in the serial data stream. Next, the packet $P_{k+2}$ is added to the data stream, see FIG. 8c. This process is continued for the other packets, so as to obtain the regenerated replica of the MPEG data stream of FIG. 8c. When comparing FIG. 8a and 8c, it will be clear that FIG. 8c shows an MPEG serial data stream having the same bit rate and packet rate as the MPEG data stream of FIG. 8a. This data stream can now be applied to a standard MPEG decoder which is capable of decoding the one video program selected by the recording arrangement during recording, from the MPEG data stream of FIG. 8c.

Figure 14:
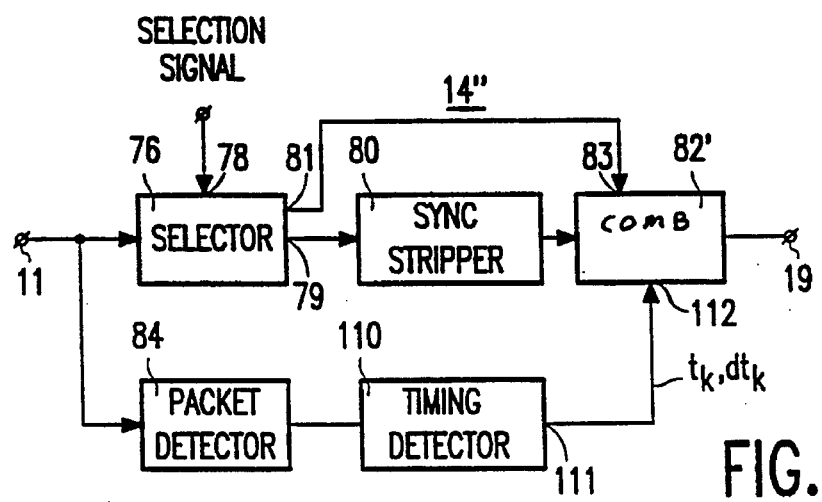
FIG. 14 shows another embodiment of the 'normal play' processing unit in the recording arrangement of FIG. 6.

FIG. 13a shows an MPEG serial data stream as a function of time, the data stream comprising packets $P_k$ having a variable length, and the bit rate in the data stream also being variable. It should be noted that the transport packets of the MPEG data stream do not comprise a packet number. The packet number k, given to the packets in FIG. 13a, are therefore only added in this description for identification purposes. FIG. 14 shows schematically an embodiment of the 'normal play' processing unit 14 for recording one video program that is included in the serial data stream as shown in FIG. 13a. The embodiment denoted 14" in FIG. 14 shows large resemblances with the embodiment of FIG. 9. The embodiment 14" differs from the embodiment of FIG. 9, in that, instead of the packet number generator 86, now a timing detector 110 is present, having its input coupled to the output of the detector 84, and having its output 111 coupled to the input 112 of the combining unit 82.

Selecting only those packets of the packets $P_k$ in the serial data stream of FIG. 13a that include information relating to one video program that will be selected again means, as an example, that the packets $P_{k-4}, P_{k-1}, P_k, P_{k+2}, P_{k+4}, P_{k+8}$ will be selected and that the intermediate packets will be thrown away. FIG. 13b shows the data stream of the selected packets that will be stored in the groups of signal blocks, as already has been explained with reference to FIGS. 10 and 11. It should be noted also here that there is no time relationship between the time axes in FIGS. 13a and 13b. Further, it should be noted that, although the packets in the data stream of FIG. 13a have unequal length, they all include 188 bytes of information. Therefore, the packets selected and displayed in FIG. 13b have been shown as packets having an equal length.

The embodiment of FIG. 14 receives the data stream of FIG. 13a and selects therefrom the packets $P_{k-4}, P_{k-1}, P_k, P_{k+2}, P_{k+4}, P_{k+8}$. The packet detector 84 detects the receipt of each packet in the original serial MPEG data stream applied to the input 11 and generates a clock impulse for each packet detected. In response to each clock impulse received, the timing detector 110 detects the time instants $t_k$, see FIG. 13a, of occurrence of the packets $P_k$. Thus at the output 111 of the detector 110 appear the time instants . . . $t_{k-4}, t_{-3}, t_{k-2}, t_{k-1}t_k$, . . . etc. Moreover the time detector 110 detects the lengths of the time intervals $dt_k$ between two subsequent time instants, where $dt_k$ equals the time interval $t_{k+1}-t_k$. Those time interval values $dt_k$ are also applied to the output 111.

Under the influence of the control signal applied to the control input 83 of the combining unit 82', the control unit combines the packets $P_{k-4}, P_{k-1}, P_k, P_{k+2}, P_{k+4}, P_{k+8}$ selected by the selector 76 as well as the time instants and corresponding time intervals $t_{k-4}, d_{k-4}, t_{k-1}, dt_{k-1}, t_k, dt_k, t_{k+2}, dt_{k+2}, t_{k+4}, dt_{k+4}, t_{k+8}, dt_{k+8}$ out of the information stream supplied by the timing detector 110 for storage into the signal blocks.

The storage of the transport packets in the signal blocks will be carried out in the same way as discussed above with reference to FIGS. 10 and 11. The storage of the timing information in the third block sections can be as follows.

In the third block section TB3.1 of the first signal block SB1 of the group G1 of FIG. 10, the timing information $t_{k-4}$ and $dt_{k-4}$ is stored. In the third block section denoted FB of the third signal block SB3 of the group G1, the timing information $t_{k-1}$ and $dt_{k-1}$ is stored. In the third block section TB3.1 of the first signal block SB1 of the group G2, the timing information $t_k$ and $dt_k$ is stored. In the third block section denoted FB of the third signal block SB3 of the group G2, the timing information $t_{k+2}$ and $dt_{k+2}$ is stored. In the third block section TB3.1 of the first signal block SB1 of the group G3, the timing information $t_{k+4}$ and $dt_{k+4}$ is stored. In the third block section denoted FB of the third signal block SB3 of the group G3, the timing information $t_{k+8}$ and $dt_{k+8}$ is stored.

It may be so that the third block section TB3.1 in the first signal block SB1 in the groups and/or the third block section FB in the third signal block SB3 in the groups is/are too small for storing the timing information. In that case, the timing information can be stored somewhere else, or can be stored partly in the third block section TB3.1 and FB and partly somewhere else, see below.

In accordance with the example of FIG. 11, the timing information $t_{k-4}$ and $d_{t-4}$ is stored in the third block sections TB3.1, TB3.2 and TB3.3 of the signal blocks SB1, SB2 and SB3 respectively of the group G1. The storage of the timing information can be carried out once in the total storage capacity of the third block sections TB3.1, TB3.2 and TB3.3 or can be repeated at least once. As an example, the timing information $t_{k-4}$ and $dt_{k-4}$ is stored in each of the third block sections TB3.1, TB3.2 and TB3.3. The timing information $t_{k-1}$ and $dt_{k-1}$ can be stored in the third block sections FB, TB3.4, and TB3.5 of the signal blocks SB3, SB4 and SB5 respectively of the group G1. The storage of the timing information can be carried out once in the total storage capacity of the third block sections FB, TB3.4 and TB3.5 or can be repeated at least once. As an example, the timing information $t_{k-4}$ and $dt_{k-4}$ is stored in each of the third block sections TB3.4 and TB3.5. It may be possible to store the timing information for the packet $P_{k-1}$ in the third block section TB3.3. It is further possible to store the timing information in the third block sections TB3.4 and TB3.5, and not in the block section FB.

The timing information for the packet $P_k$ can be stored in the third block sections of the group G2 in the same way as the timing information for the packet $P_{k-4}$ has been stored in the third block sections of the group G1. The timing information for the packet $P_{k+2}$ can be stored in the third block sections of the group G2 in the same way as the timing information for the packet $P_{k-1}$ has been stored in the third block sections of the group G1.

The timing information for the packet $P_{+4k}$ can be stored in the third block sections of the group G3 in the same way as the timing information for the packet $P_{k-4}$ has been stored in the third block sections of the group G1. The timing information for the packet $P_{k+8}$ can be stored in the third block sections of the group G3 in the same way as the timing information for the packet $P_{k-1}$ has been stored in the third block sections of the group G1.

Figure 15:
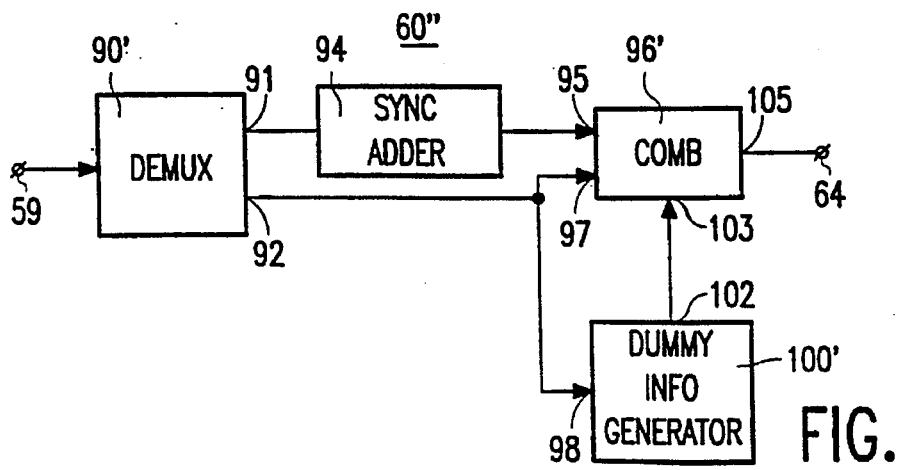
FIG. 15 shows another embodiment of the 'normal play' processing unit in the reproducing arrangement of FIG. 7.

FIG. 15 schematically shows an embodiment of the 'normal play' processing unit 60 of the reproducing arrangement of FIG. 7, denoted 60", for regenerating a replica of the original MPEG data stream of FIG. 13a from the data stream as shown in FIG. 13b, using the timing information also stored in the signal blocks, in the way described above. The regenerated replica of the MPEG data stream is shown in FIG. 13c. The embodiment 60" of FIG. 12 shows a large resemblance with the processing unit of FIG. 12. The demultiplexer 90' is again adapted to retrieve the packets from the subsequent groups of signal blocks, and to supply the packets to the output 91. The demultiplexer 90' is further adapted to retrieving the timing information $t_k$ and $dt_k$ from the third block sections in the signal blocks, and for supplying the said timing information to the output 92. A sync byte is added to each packet in the sync adder 94. The packets thus obtained are supplied to the input 95 of the combining unit 96'. The output 92 of the demultiplexer 90 is coupled to inputs 97 and 98 of the combining unit 96' and a dummy info generator 100' respectively for supplying the timing information to the combining unit 96' and the generator 100'.

Let us now assume that the packet $P_{k-4}$ and the corresponding timing information are retrieved from the first group G1 of five signal blocks, and are applied to the combining unit 96' and the dummy packet generator 100'. This results in the packet $P_{k-4}$ being supplied to the output 105 by the combining unit 96', in response to the timing information. The length of the packet $P_{k-4}$ will be equal to $dt_{k-4}$, and the packet will be applied to the output 105 at a time instant corresponding to $t_{k-4}$. Next, the packet $P_{k-1}$ and the timing information corresponding to the packet $P_{k-1}$ are retrieved from the group G1 and are applied to the combining unit 96' and the dummy packet generator 100'. It is established, by means of a comparator and/or a subtractor (not shown), that the time instant $t_{k-1}$ is not equal to $t_{k-4}+dt_{k-4}$. Consequently at least one packet following the packet $P_{k-4}$ has been thrown away during recording. As a result, the dummy info generator 100' generates a block of dummy information so as to fill the gap between the end of the packet $P_{k-4}$, at the time instant $t_{k-4}+dt_{k-4}$, and the time instant $t_{k-1}$, see FIG. 13c.

Next, the combining unit 96' inserts the packet $P_{k-1}$ having the length $dt_{k-1}$ into the serial data stream.

The packet $P_k$ is the next packet that is retrieved by the demultiplexer 90, and the packet is supplied, after the addition of the sync byte, to the input 95 of the combining unit 96'. The timing information corresponding to the packet $P_k$ is supplied to the inputs 97 and 98 of the combining unit 96 and the dummy info generator 100'. As $t_k$ equals $t_{k-1}+dt_{k-1}$, no dummy information need to be is generated, and the packet $P_k$ is supplied to the output 105.

Next the packet $P_{k+2}$ is retrieved. After comparison of $t_{k+2}$ with $t_k+dt_k$, it is established that a gap is present that need to be filled with dummy information generated by the generator 100'. Next, the packet $P_{k+2}$ having a length $dt_{k+2}$ is added to the data stream, see FIG. 13c. This process is continued for the other packets, so as to obtain the regenerated replica of the MPEG data stream of FIG. 13c. When comparing FIG. 13a and 13c, it will be clear that FIG. 13c shows an MPEG serial data stream having the same (variable) bit rate and packet rate as the MPEG data stream of FIG. 13a. This data stream can now be applied to a standard MPEG decoder which is capable of decoding the one video program selected by the recording arrangement during recording, from the MPEG data stream of FIG. 13c having the variable bit rate and packet rate.

Now, other information will be described that can be inserted in the free space in the groups of signal blocks alone or together with the packet number information and/or the timing information described above.

One example of such other information is the information identifying a signal block in a group of y(=5) signal blocks to be the first signal block in the group of signal blocks. Such information can be stored in the third block sections TB3.1 of the signal blocks SB1 in the groups G1, G2 and G3, in FIGS. 10 and 11.

Another example of such other information is the inclusion of a signal block number in the third block sections of the signal blocks, such as in the situation of FIG. 11. Signal block numbering can be carried out within a group, so that in the example of FIG. 11, the numbers 1 to 5 are stored in the third block sections TB3.1 to TB3.5 respectively of the signal blocks SB1 to SB5 in each group. Signal block numbering can also be realized for a larger number of signal blocks, belonging to more than one group of signal blocks. One could imagine that all the signal blocks in one track have a unique signal block number stored in the third block sections of the signal blocks. Now, all the signal blocks in a track can be identified by their unique signal block number.

Signal block numbering the signal blocks as described above has a number of advantages. Numbering the signal blocks open the possibility to shuffle signal blocks in an order different from their original order, as long as the shuffling is done within a group of signal blocks identified by unique signal block numbers. By detecting the signal block numbers upon reproduction, a deshuffling can be carried out on the shuffled signal blocks so as to obtain the original sequence order of the signal blocks.

Another measure that can be carried out is repeating a signal block, for the reason that the recording and subsequent reproduction of the information included in the signal block require a higher protection against transmission errors. Repeated signal blocks will have the same signal block numbers so that they are identifiable upon reproduction.

Further, upon detection of the signal block numbers, it can be detected whether a signal block has been lost because of transmission errors occurring during the subsequent recording and reproduction step. When missing a signal block number in a sequence of signal block numbers, it can be decided that the signal block having the signal block number that has been missed is lost. Upon such detection, an error correction or concealment can be carried out so as to correct or conceal the missing signal block.

Figure 16:
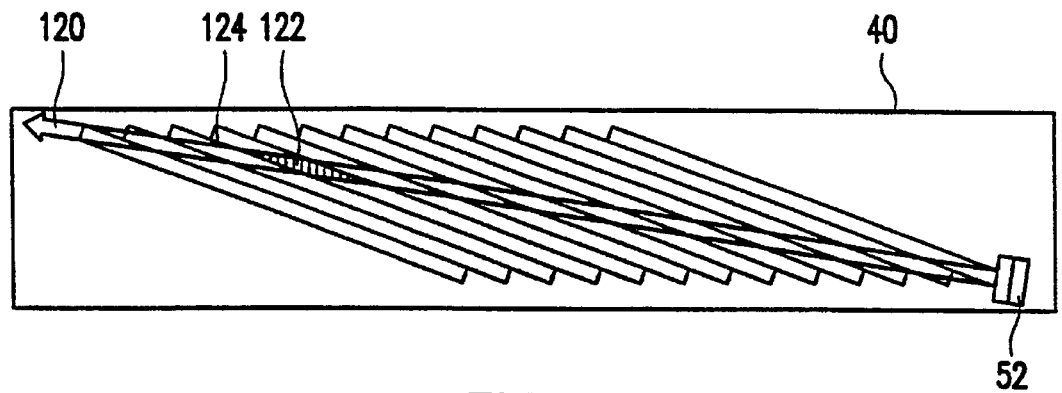
FIG. 16 shows the record carrier and the read head scanning the record carrier during a trick play mode.

Next, an explanation will be given of the functioning of the 'trick play' processing units 16 and 62 in the recording arrangement of FIG. 6 and the reproducing arrangement of FIG. 7 respectively. For carrying out a trick mode (or feature mode) reproduction with the reproduction arrangement, the record carrier 40 is transported with a speed other than the nominal transport speed. FIG. 16 shows the record carrier 40 having a number of slant tracks recorded on it. FIG. 16 also shows a path, denoted by the reference numeral 120, via which path the reading head 52 scans the record carrier in said trick mode. Generally, the information in the tracks is recorded by at least two heads having gaps of different azimuth angles, so that even numbered tracks have the one azimuth and odd numbered tracks have the other azimuth.

That means that, when scanning the record carrier along the path 120, the head 52, which head has one of the two azimuth angles, will be able to read information from only the even numbered or only the odd numbered tracks.

In order to enable a reproduction of video information during a trick play mode, especially in the case of video information being recorded in a data reduced form, it is required to add special trick play information in special locations in the tracks such that those locations are scanned by the head 52 for the various transport speeds for the record carrier that are possible in a trick play mode. This trick play information is special video information recorded in addition to the normal play video information that has been recorded in the tracks in the way described above. As a consequence some of the signal blocks in a track comprise this trick play information, which should be scanned and read by the head 52 in the trick play mode.

It should be noted here that the MPEG data, as far as the video data in the MPEG data stream is concerned, comprises data reduced video information. To realize such data reduced video information the information corresponding to one picture is intra encoded so as to obtain so called I-frames. A higher data reduction can be obtained by carrying out an interframe encoding on at least two subsequent pictures, resulting in an I-frame for the first picture and a P-frame for the second picture. For recreating the two pictures an intraframe decoding, inverse to the intraframe encoding, must be carried out on the I-frame information, so as to regenerate the first picture, and an interframe decoding, inverse to the interframe encoding, must be carried out using both the I-frame information and the P-frame information, so as to regenerate the second picture.

In a trick mode, only I-frame information can be used to regenerate a video signal, as retrieving not only the I-frame information but also the corresponding P-frame information so as to realize an interframe decoding, is not possible. Therefore, in order to obtain the 'trick play' information, only the information stored in I-frames included in the serial MPEG data stream is extracted and used as 'trick play' data.

Figure 17:
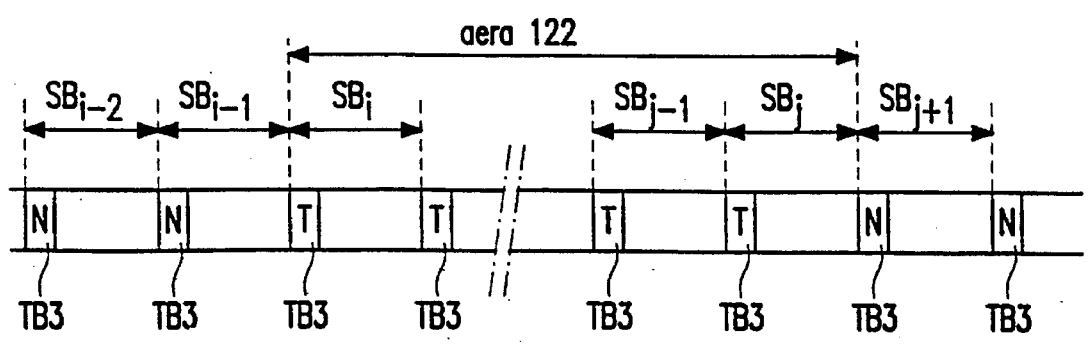
FIG. 17 shows the sequence of signal blocks in a track forming the trick play area.

It can be said that in a special location in a track, such as in the location indicated by the hatched area 122 in the track 124 in FIG. 16, a number of signal blocks are inserted that comprise the 'trick play' information. FIG. 17 shows the sequence of signal blocks in the track 124. The hatched area 122 in FIG. 16 is formed by the sequence of signal blocks $SB_i$ to $SB_j$ inclusive in the sequence given in FIG. 17. The third block sections TB in the signal blocks comprised in the trick play area 122 of the track now comprise an indication that the signal blocks comprise trick mode information. This indication information is denoted by 'T' in the third block sections TB3 of the signal blocks $SB_i$ to $SB_j$ inclusive. The signal blocks stored in the track prior to the trick play area 122, as well as the signal blocks stored in the track after the trick play area 122 comprise information indicating that the information stored in the signal blocks is normal play information. This indication information is denoted by 'N' in the third block sections TB3 in the signal blocks $SB_{i-2}$, $SB_{i-1}$, $SB_{j+1}$.

The 'trick play' processing unit 16 of FIG. 6 is thus capable of deriving the trick play information from the MPEG data stream applied to its input 17, storing the trick play information in those signal blocks that are specifically meant for storing the trick play information in a specific location in a track and for inserting the indication information indicating that the signal block is a signal block in which trick mode information is stored in the third block sections of those signal blocks. The 'normal play' processing unit 14 will further be capable of storing the indication information indicating that the signal blocks generated by the unit 14 comprise normal play information, in the third block sections of those signal blocks.

When the reproducing arrangement is switched into its trick mode, the 'trick play' processing unit 62 will be capable of detecting those signal blocks that have the 'T' identification stored in their third block sections and to retrieve the information from those signal blocks for further processing so as to realize a reviewing option during the trick mode.

The embodiments described above describe a scheme for receiving an MPEG transport stream, recording it asynchronously on a DVCR, and recreating the original MPEG transport stream during playback. This can be broadly viewed as a method of transmitting timing critical data (the MPEG data stream) via an asynchronous channel (the DVCR).

In addition to transmitting MPEG data streams, there are various other applications that may require the transmission of timing critical data over an asynchronous channel. Asynchronous here means that the physical data rate of the channel is different from the transport rate, the rate of the data to be transmitted, so that the bitwise timing of data is not maintained through the channel transmission.

In the MPEG transport stream as an example of timing critical data, the relative arrival time of a datum which represents timing information of the transport stream, i.e., the Program Clock Reference (PCR), must not be changed beyond a specified tolerance through transmission without changing the PCR value accordingly. This is because otherwise, the Phase Lock Loop (PLL) circuitry of a decoder will fail to regenerate the data clock, and the buffers may under/overflow.

This problem of how to transmit timing critical data over an asynchronous channel without changing any datum to be transmitted also exists where the asynchronous channel is a computer network, a telephone network or a digital interface, e.g. P1394.

As explained above in connection with the MPEG application, the basic scheme is to tag each transmission unit, e.g., an MPEG transport packet, with timing information before transmission and use the tagged information to recreate the proper data timing at the other end of the channel. Three possible situations may arise.

1. If both the size of the transmission unit and the transport rate are known and constant The transmitter side of the channel tags each transmission unit with a sequence number, which is increased by one at each transmission unit. The tagging is done, as one example, by inserting a fixed number of bits in front of each transmission unit. A number of bits for the tagging is chosen so that the number of sequence represented is large enough to cope with the maximum consecutive missing transmission units due to, for example, channel errors. The receiver side of the channel has a buffer and a counter. The counter is loaded with the sequence number of the first received transmission unit at the beginning of each transmission session and is increased by one each time when the receiver sends out a transmission unit or a dummy unit. If the sequence number of a received transmission unit matches the counter value, the received transmission unit is sent out, otherwise, a necessary number of dummy units are sent out until the counter value matches the sequence number. The receiver strips off the tagged information and sends out a transmission unit or a dummy unit at the known and constant rate.

2. If the size of the transmission unit is known and constant but the transport rate is unknown The transmitter side of the channel tags each transmission unit with, for example, two pieces of information which is sufficient to determine the start time and the end time of the transmission unit. For instance, a pair of the start time and the end time itself or a pair of the start time and the time duration of the transmission unit can be used. The receiver side of the channel now has to regenerate the transport rate from the tagged information in addition to checking the start time of each transmission unit. There is no need to insert dummy units in this case.

3. If only the timing of specific data is important

If there is no need to maintain the idiosyncracy of the entire transport stream, i.e., only the timing of specific data has to be maintained, there is no need to regenerate the transport rate from the tagged information, provided the transport rate generated by the receiver is high enough so that no time overlap of transmission units will occur. The transmitter side of the channel tags each transmission unit with the location of the timing critical datum and its expected arrival time. If the location is known and constant, the location information can be omitted. If there are more than one timing critical data in each unit, a number of extra information pairs can be added accordingly. The receiver side of the channel determines the start time of each transmission unit from the output transport rate, the location and the expected arrival time of the timing critical datum. There is no need to insert dummy units in this case.

Figure 18:
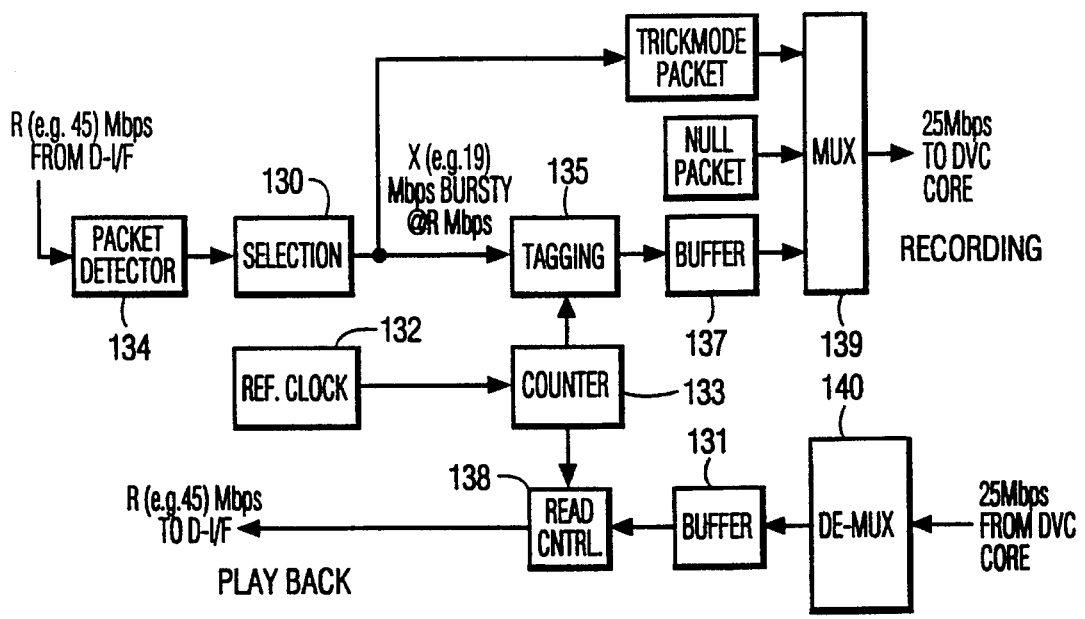
FIG. 18 shows another embodiment of the invention combining the recording and playback systems.

FIG. 18 is a block diagram of another form of the basic system, again applied to the MPEG application where R represents the transport rate of the MPEG data stream subdivided into transmission units in the form of a succession of transport packets from a digital interface (D-I/F).

Selection block 130 corresponds to the selector 76 of FIG. 9. This embodiment corresponds to situation 2, and thus comprises a reference clock 132 and counter 133 to determine the timing information of the inputted data stream and tag each transport packet via block 135 with a "time of arrival" (TOA) stamp and "duration of arrival" (DOA) stamp, both with respect to the local counter. These tagging bits are recorded via buffer 137 onto tape along with the corresponding transport packets (TPs) using the extra bits available from the 2 to 5 sync blocks mapping as described earlier.

On playback, each recorded packet is read out at its correct time and rate according to the "time of arrival" and "duration of arrival" stamp information under control of a read control block 138. The TOA stamp indicates the time when the VCR should start reading that particular TP from the buffer 131 and output it to the D-I/F. The DOA stamp indicates the rate at which that TP should be read out, i.e., 188 bytes of that TP must be read during the DOA of that packet; hence the rate can be easily computed. The MUX block 139 is used in the normal way to interleave the tagged packets with trickmode and null packets as desired, and the DE-MUX block 140 acts to strip added packets on playback. This scheme reproduces all the desired packets at precisely the right time and at the correct rates. However, the output stream does not fill in the missing packets, hence has gaps. The main reason for this is that the input stream can have gaps which are not an integer number of transport packet length. For example, the Grand Alliance stream is expected to have gaps which are as small as 20 bytes long. These can obviously not be filled by the VCR. Moreover, in this scheme the nonrecorded PID packets also appear as gaps in the output transport stream.

Figure 19:
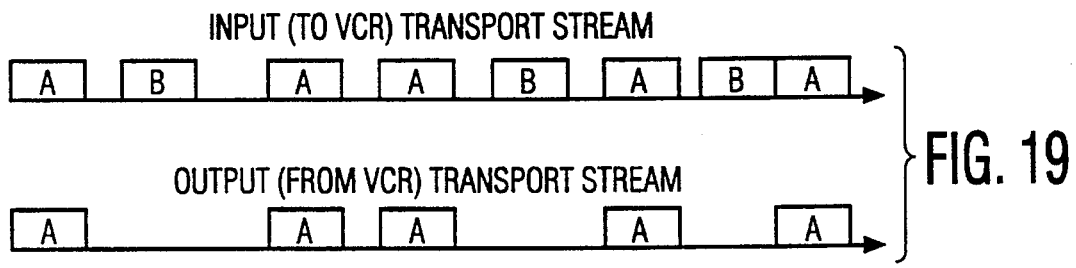
FIG. 19 shows an example of the input and output data streams from the apparatus of FIG. 18.

FIG. 19 gives an example of the transport stream resulting. In the upper diagram, as an example, the input transport stream is a two program stream: program A and B. We record only program A. On playback, all the packets belonging to program. A are reproduced at precisely their original times and rates, however there is no filling in for the nonrecorded program B. Hence the output stream, shown in the lower diagram, is more bursty than the input stream. If the input stream was a valid MPEG signal, the output stream will also be valid.

The timing information in the input data stream R can be determined in a number of different ways not important to the invention. One simple way, as an example, is to connect the input data stream to a known packet detector circuit 134 which can detect the start and end times of each incoming TP. The outputs of the packet detector circuit can then be used to detect counter values of the counter 133 which represent the desired timing information. The reference clock 132 must be the same frequency for the recording and playback process for consistent interpretation of the tagged information, and appropriate steps taken to initialize the counter 133 in a predetermined manner that is consistent during recording and playback. The recorded timer information is stripped from the transport stream in the read control block 138 and is used to determine when the stored TPs can be output.

Figure 20:
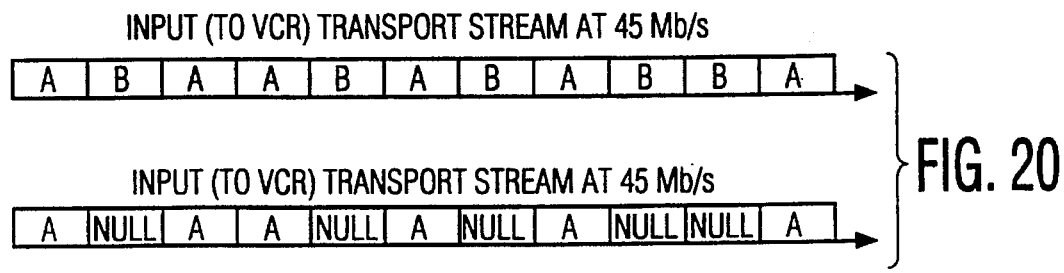
FIG. 20 shows another example of input and output data streams from apparatus similar to that of FIG. 18.

For situation 1, where the transport rate of the incoming transport stream is constant and known, a variation on the previous method can be used to recreate this stream on playback. The main features of this embodiment require only a local counter (in place of the reference clock and counter of FIG. 18), incrementing at the arrival of each transport packet, and tagging each transport packet with a "sequence of arrival" (SOA) stamp, using the extra bits available from the 2 to 5 mapping. On playback, each time a "discontinuity" in the SOA tag is detected, it is assumed to have come from a TP that has not been recorded. These "missing" packets are replaced with Null packets. All TPs are output at the known and constant transport rate. The FIG. 20 time diagrams illustrate the input and output streams showing maintenance of the critical timing information.

In the block diagram of FIG. 18, only the data flow is shown by the arrows. Those skilled in the art will understand that several of the blocks are interconnected for command and control signals that are not shown in the figure.

Figure 21:
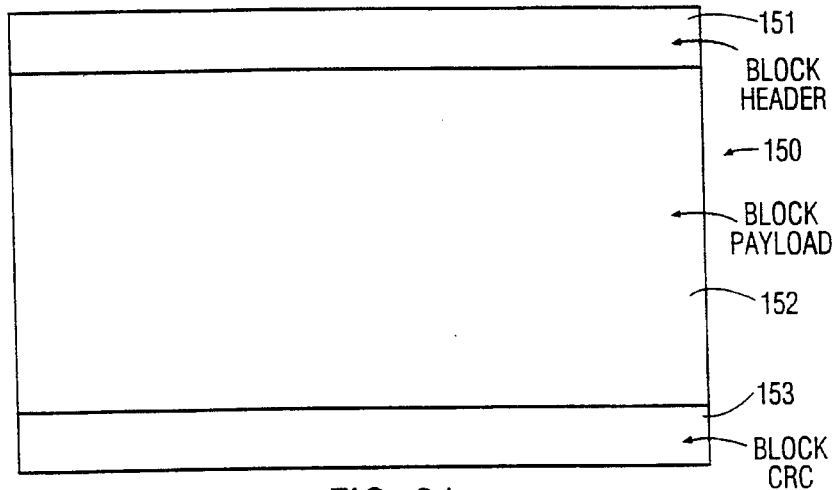
FIG. 21 shows one form of data block of the invention for transmission over an asynchronous channel.
Figure 22:
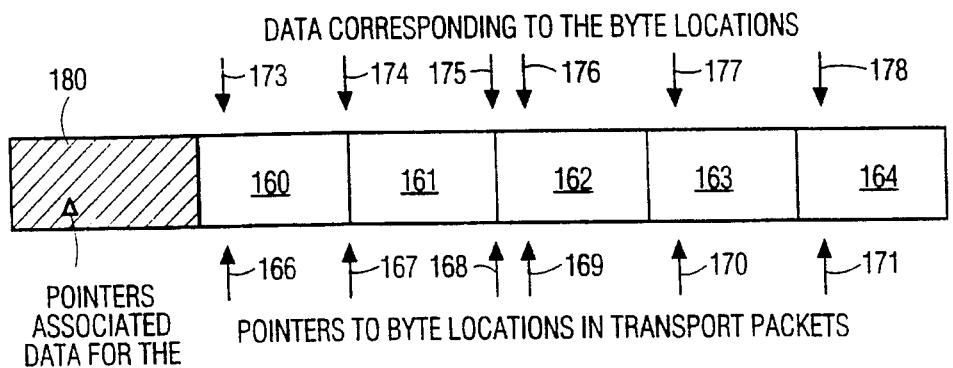
FIG. 22 shows in more detail the block payload of the data block of FIG. 21.

As previously indicated, the invention is also applicable to other data formats and other ways of preserving the critical timing data. FIG. 21 shows a block data transmission unit of some channel in which each data block 150 comprises a preamble 151 in the form of a block header, a block payload 152 for carrying the data stream, and a postamble 153 in the form of a block CRC. FIG. 22 shows one example of the formatting of the block payload 152 in an MPEG application. In this example, the block payload 152 carries 5 188 byte MPEG transport packets 160 . . . 164. There are 6 pointers 166 . . . 171 to byte positions of the transport packets. Data 173 . . . 178 associated with each byte pointer 166.171 is timing information. All pointers and associated data representing timing information require an extra 24 bytes, as one example, to be stored in addition to the 5 transport packets. These are stored in a payload tag or header 180. Assuming for the example 10 bits for each byte location pointer×6 pointers (166 . . . 171)=60 bits; 21 bits for each timing data pointer×6 pointers (173 . . . 178)=126 bits; totalling 186 bits or approximately 24 bytes.

As will be noted, the byte position pointers need not all point to the beginning and the end of a particular packet. In this example, which is preferred, only byte location pointers 167 and 168 point to the beginning and end locations of the second transport packet 161. The other byte location pointers point to a location offset from the beginning. That offset location preferably is the location of the PCR, typically located at the 12th byte after the beginning of the transport packet and which is conventionally used for timer recovery as a sync pulse to lock the clock in the apparatus to the clock of the encoding source of the data stream. By this choice of byte location pointers, only 6 pointers 166 . . . 171 are needed to unambiguously identify the timing information of the sequence of 5 packets 160 . . . 164, with 1 packet having 2 pointers and with the remaining 4 packets having only 1 pointer. The associated data 173 . . . 178 in this case is the time instants pointed to by the 6 pointers. The associated data can also include the packet number. Where the bit rate is known and constant, the data could be the packet number alone. The resultant total payload is the 5 packets 160 . . . 164 plus the payload header or tag 180 which contains the timing information for the succeeding 5 TPs.

It will be understood that what is contained in the header 180 are two fields associated with information unit. For example, it would contain the byte location pointed to by pointer 166 and a second field containing, for example, the timing information for that byte location.

To implement the scheme illustrated in FIGS. 21 and 22, the same apparatus depicted in FIG. 18 can be used with a block formatter stage positioned before the buffer stage 137 to provide the block formatting including providing the block header, computing and adding the payload tag, and adding the transport packets and CRC block before recording.

Figure 23:
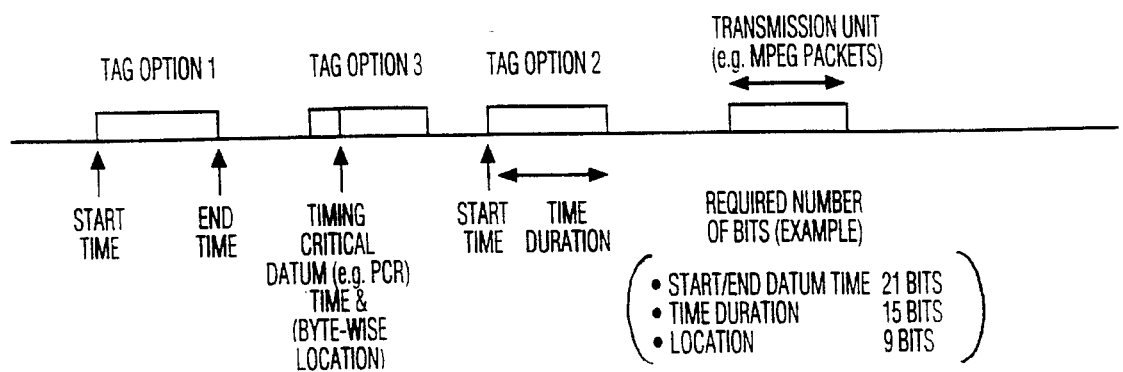
FIG. 23 shows various tagging options in accordance with the invention.

The various tagging options usable with the invention are summarized in FIG. 23. Tag option 1 includes the packet start and end times; tag option 2 includes the packet start time and packet duration; tag option 3 includes a timing critical datum such as the PCR whose location is known, thus only 1 pointer or item of information compared with the other options which require at least two information items.

It will be understood that the expression "timing information" has been used herein in its broadest sense to include not only the information depicted in FIG. 23, but also packet sequence numbers, and in general all information needed for timing transparency, meaning that from the view of an external observer, the channel does not affect or alter the timing.

The invention has been described in a situation where real-time data (the broadcast or transmitted-by-cable MPEG information signal) is recorded on non-real-time media (the DVCR). Another important example is what is known as a P1394 D-I/F and in which an asynchronous transfer is involved in which it is essential to recover the timing of the original data stream.

In P1394 interface protocal, data blocks similar to that shown in FIG. 21 are used for data transmission, for example, between computers or consumer electronic apparatus. If the data was MPEG transport packets, the description given above with respect to FIGS. 21 and 22 could be used. In this case, the channel is not storing the MPEG data stream but due to the asynchronous nature of the P1394 interface, the correct timing of the MPEG packets is lost without using the invention described herein.

What is claimed is:

1. A method of transmitting timing-critical data of unknown transmission rate via an asynchronous channel, comprising the steps:
   (i) providing the timing-critical data subdivided into a stream of successive critically-timed transmission units,
   (ii) determining from the timing-critical data at least two items of timing information from which the timing-critical data can be recreated,
   (iii) tagging the transmission units with the items of timing information,
   (iv) transmitting the transmission units tagged with the items of timing information over the asynchronous channel,
   (v) receiving from the channel the transmission units tagged with the items of timing information,
   (vi) recreating from the transmission units and the items of timing information received in step (v) the timing-critical data.

2. The method of claim 1, wherein the timing-critical data is an MPEG data stream, and the transmission units are transport packets.

3. The method of claim 2, wherein the channel is a digital VCR.

4. The method of claim 2, wherein the channel is a computer network, a telephone network, or a digital interface.

5. The method of claim 1, wherein the items of timing information for one transmission unit comprise only one pointer to a byte location of the transmission unit and timing information associated with the byte location.

6. The method of claim 1, wherein the timing critical data is formatted as a data block comprising in order a block header, a block payload comprising a plurality of the transmission units with said timing information, and an error-checking block.

7. The method of claim 1, wherein the two items of timing information comprise the start time and end time of a transmission unit.

8. The method of claim 1, wherein the two items of timing information comprise in a transmission unit the location of timing-critical data and the expected arrival time of the timing-critical data.

9. A method of transmitting timing-critical data via an asynchronous channel, comprising the steps:
   (i) providing the timing-critical data subdivided into a stream of successive critically-timed transmission units,
   (ii) determining from the timing-critical data one or more items of timing information from which the timing-critical data can be recreated,
   (iii) tagging the transmission units with the items of timing information,
   (iv) transmitting the transmission units tagged with the items of timing information over the asynchronous channel,
   (v) receiving from the channel the transmission units tagged with the items of timing information,
   (vi) recreating from the transmission units and the items of timing information received in step (v) the timing-critical data,
   wherein the items of timing information for a plurality of transmission units comprise two pointers to byte locations for some of the plurality of transmission units and one pointer to a byte location for the remainder of the plurality of transmission units together with timing information associated with the respective byte location of the remainder of the plurality of transmission units.

10. The method of claim 9, wherein the timing information for the plurality of transmission units is stored in a data unit associated with the plurality of transmission units.

11. The method of claim 9, wherein the two pointers point to the start and end times respectively of said some of the plurality of transmission units.

12. The method of claim 11, wherein the byte location pointed to by said one pointer comprises data representing an instant of time associated with the respective byte location of the remainder of the plurality of transmission units.

13. The method of claim 12, wherein the plurality of transmission units are transport packets of an MPEG information signal.

14. The method of claim 13, wherein the byte location pointed to by said one pointer comprises a PCR.

15. The method of claim 13, wherein the plurality of transmission units are 5 in number.

16. A method of transmitting timing-critical data via an asynchronous channel, comprising the steps:
   (i) providing the timing-critical data subdivided into a stream of successive critically-timed transmission units,
   (ii) determining from the timing-critical data one or more items of timing information from which the timing-critical data can be recreated,
   (iii) tagging the transmission units with the items of timing information,
   (iv) transmitting the transmission units tagged with the items of timing information over the asynchronous channel,
   (v) receiving from the channel the transmission units tagged with the items of timing information,
   (vi) recreating from the transmission units and the items of timing information received in step (v) the timing-critical data,
   wherein the timing critical data is formatted as a data block comprising in order a block header, a block payload, and an error-correcting block, said block payload comprising a plurality of transmission units and one tag packet containing the timing information for the plurality of transmission units.

17. Apparatus for transmitting timing-critical data of unknown transmission rate via an asynchronous channel, comprising:
   (i) means for receiving the timing-critical data subdivided into a stream of successive critically-timed transmission units,
   (ii) means for determining from the timing-critical data at least two items of timing information from which the timing-critical data can be recreated,
   (iii) means for tagging the transmission units with the items of timing information,
   (iv) means for transmitting the transmission units tagged with the items of timing information over the asynchronous channel,
   (v) means for receiving from the channel the transmission units tagged with the items of timing information,
   (vi) means for recreating from the transmission units and the items of timing information received in claim element (v) the timing-critical data.

18. The apparatus of claim 17, wherein the timing-critical data is an MPEG data stream, and the transmission units are transport packets.

19. The apparatus of claim 17, wherein the channel comprises a computer network, a telephone network, or a digital interface.

20. Apparatus for transmitting timing-critical data via an asynchronous channel, comprising:
   (i) means for receiving the timing-critical data subdivided into a stream of successive critically-timed transmission units,
   (ii) means for determining from the timing-critical data one or more items of timing information from which the timing-critical data can be recreated,
   (iii) means for tagging the transmission units with the items of timing information,
   (iv) means for transmitting the transmission units tagged with the items of timing information over the asynchronous channel,
   (v) means for receiving from the channel the transmission units tagged with the items of timing information,
   (vi) means for recreating from the transmission units and the items of timing information received in claim element (v) the timing-critical data,
   (vii) said timing information for a plurality of transmission units comprising two pointers to byte locations for some of the plurality of transmission units and one pointer to a byte location for the remainder of the plurality of transmission units together with timing information associated with the respective byte location of the remainder of the plurality of transmission units.

21. The apparatus of claim 20, further comprising means for storing said timing information for a plurality of transmission units in a data unit associated with said plurality of the transmission units.

22. Apparatus for transmitting timing-critical data via an asynchronous channel, comprising:
   (i) means for receiving the timing-critical data subdivided into a stream of successive critically-timed transmission units,
   (ii) means for determining from the timing-critical data one or more items of timing information from which the timing-critical data can be recreated,
   (iii) means for tagging the transmission units with the items of timing information,
   (iv) means for transmitting the transmission units tagged with the items of timing information over the asynchronous channel,
   (v) means for receiving from the channel the transmission units tagged with the items of timing information,
   (vi) means for recreating from the transmission units and the items of timing information received in claim element (v) the timing-critical data,
   (vii) said timing critical data being formatted as a data block comprising in order a block header, a block payload, and an error-correcting block, said block payload comprising a plurality of transmission units and one tag packet containing the timing information for the plurality of transmission units.

\* \* \* \* \*